United States Patent
Tanaka

(10) Patent No.: US 7,576,897 B2
(45) Date of Patent: Aug. 18, 2009

(54) METHOD AND DEVICE FOR ACQUIRING INFORMATION FOR COMPENSATING COLOR DRIFT AND MEDIUM WITH PROGRAM FOR THE SAME RECORDED THEREON

(75) Inventor: Kentaro Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 641 days.

(21) Appl. No.: 11/182,053

(22) Filed: Jul. 15, 2005

(65) Prior Publication Data

US 2006/0077407 A1 Apr. 13, 2006

(30) Foreign Application Priority Data

Jul. 16, 2004 (JP) ............... 2004-209899

(51) Int. Cl.
H04N 1/60 (2006.01)
H04N 1/407 (2006.01)
H04N 1/409 (2006.01)
G06T 5/00 (2006.01)
G03F 3/08 (2006.01)

(52) U.S. Cl. .............. 358/523; 358/1.9; 358/3.26; 358/3.27; 358/518

(58) Field of Classification Search ............... 358/1.9, 358/3.26, 3.27, 504, 515, 518–523, 2.1; 347/12, 13, 14, 15, 19, 41, 42, 43, 57, 58; 399/301

See application file for complete search history.

(56) References Cited

U.S. PATENT DOCUMENTS

| | | | | |
|---|---|---|---|---|
| 5,946,011 A * | 8/1999 | Kanaya | ........................ | 347/41 |
| 5,995,802 A * | 11/1999 | Mori et al. | ................... | 399/394 |
| 6,008,907 A * | 12/1999 | Vigneau et al. | .............. | 358/1.9 |
| 6,026,216 A * | 2/2000 | Ohtsuka et al. | .............. | 358/1.9 |
| 6,031,627 A * | 2/2000 | Kakutani | ..................... | 358/1.9 |
| 6,145,962 A * | 11/2000 | Kanematsu et al. | .......... | 347/43 |
| 6,213,579 B1 * | 4/2001 | Cornell et al. | ................ | 347/14 |
| 6,278,477 B1 * | 8/2001 | Ohba | ......................... | 347/251 |
| 6,354,688 B1 * | 3/2002 | Inoue et al. | ................... | 347/15 |
| 6,354,689 B1 * | 3/2002 | Couwenhoven et al. | ....... | 347/19 |
| 6,404,509 B1 * | 6/2002 | Kuwata et al. | .............. | 358/1.9 |
| 6,522,778 B1 * | 2/2003 | Tamagawa | .................. | 382/167 |
| RE38,180 E * | 7/2003 | Edge | .......................... | 347/19 |
| 6,621,594 B1 * | 9/2003 | Kuwata et al. | .............. | 358/3.1 |
| 6,671,067 B1 * | 12/2003 | Adam et al. | ................. | 358/1.6 |
| 6,700,593 B2 * | 3/2004 | Otsuki | ......................... | 346/19 |

(Continued)

FOREIGN PATENT DOCUMENTS

JP 10-278360 A 10/1998

Primary Examiner—Twyler L Haskins
Assistant Examiner—Jonathan R Beckley
(74) Attorney, Agent, or Firm—Sughrue Mion, PLLC

(57) ABSTRACT

Patches (standard images) are printed on a printing medium with a standard ink recording quantity with a printer (printing device) 20 filled with alternative ink different from corresponding inks. The printed patches are subjected to colorimetry in the Lab color space (predetermined color space) to acquire alternative colorimetry data. The acquired alternative colorimetry data is converted into predictive colorimetry data obtained when patches are printed on a printing medium with the standard ink recording quantity with the printer 20 filled with the corresponding inks and subjected to colorimetry in the Lab color space. ID (error information) that represents the result of correlation between the predictive colorimetry data obtained by the conversion and predetermined reference colorimetry data is acquired.

4 Claims, 18 Drawing Sheets

U.S. PATENT DOCUMENTS

| | | | |
|---|---|---|---|
| 6,755,498 B2* | 6/2004 | Revie et al. | 347/15 |
| 6,757,076 B1* | 6/2004 | Mestha et al. | 358/1.9 |
| 6,793,321 B2* | 9/2004 | Fujimori | 347/41 |
| 6,864,995 B2* | 3/2005 | Nogiwa et al. | 358/1.9 |
| 6,906,825 B1* | 6/2005 | Nakahara et al. | 358/1.9 |
| 7,054,033 B2* | 5/2006 | Namikata | 358/1.9 |
| 7,104,626 B2* | 9/2006 | Oyen | 347/19 |
| 7,113,732 B2* | 9/2006 | Ohmori | 399/301 |
| 7,206,100 B2* | 4/2007 | Namikata | 358/3.23 |
| 7,239,425 B2* | 7/2007 | Namikata | 358/2.1 |
| 7,280,251 B1* | 10/2007 | Holub | 358/1.9 |
| 7,307,753 B2* | 12/2007 | Sasaki et al. | 358/1.9 |
| 7,348,993 B2* | 3/2008 | Stokes et al. | 345/589 |
| 7,354,127 B2* | 4/2008 | Endo | 347/19 |
| 7,355,750 B2* | 4/2008 | Saito et al. | 358/1.9 |
| 7,365,890 B2* | 4/2008 | Saito et al. | 358/523 |
| 7,385,739 B2* | 6/2008 | Ohga et al. | 358/518 |
| 7,460,283 B2* | 12/2008 | Saito | 358/515 |
| 2002/0118210 A1* | 8/2002 | Yuasa et al. | 345/589 |
| 2002/0180998 A1* | 12/2002 | Wu | 358/1.9 |
| 2003/0202192 A1* | 10/2003 | Kuwata et al. | 358/1.9 |
| 2003/0214686 A1* | 11/2003 | Saito et al. | 358/504 |
| 2004/0100640 A1* | 5/2004 | Saito | 358/1.1 |
| 2004/0233463 A1* | 11/2004 | Hersch et al. | 358/1.9 |

* cited by examiner

FIG. 10

Correspondence data 14f

|  | First printer | Reference printer | Second printer |
|---|---|---|---|
| Alternative ink selected color component quantity | $L_{53}$ | $L_{43}$ | $L_{63}$ |
| Corresponding ink selected color component quantity | $b_{13}$ | $b_{03}$ | $b_{23}$ |

|  |  | First printer |  | Reference printer |  | Second printer |  |
|---|---|---|---|---|---|---|---|
| Alternative ink selected color component quantity | ... | $L_{53}$ | ...L... | $L_{43}$ | ...L... | $L_{63}$ | ... |
| Corresponding ink selected color component quantity | ... | $b_{13}$ | ...b... | $b_{03}$ | ...b... | $b_{23}$ | ... |

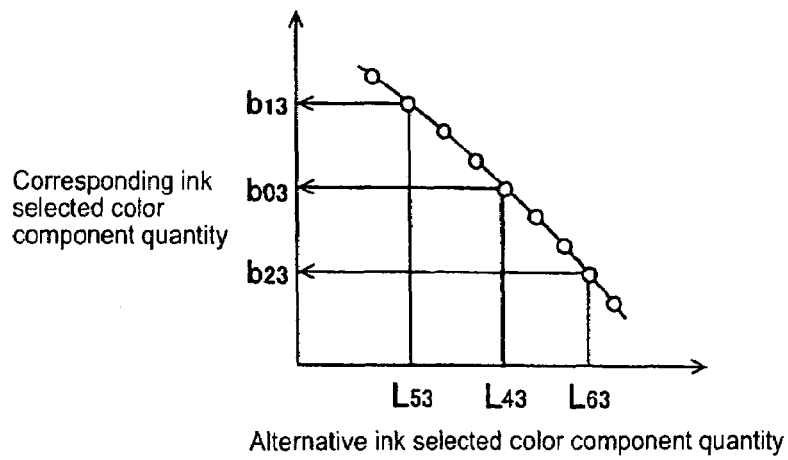

Alternative ink selected color component quantity

FIG. 11

Standard recording rate table T1

(In case set mode of Y is 1)

Ink quantity of dot
Small ←————————→ Large

| Kind of dot | Small dot 1 | Medium dot 1 | Large dot 1 |
|---|---|---|---|
| Standard dot recording rate | 90% | 50% | 30% |

High ←————————→ Low
Dot recording rate

Example of color correction data 14b

FIG. 16

Dot allocation table 14d

| Input gradation value | Output gradation value | | | | | | | | |
|---|---|---|---|---|---|---|---|---|---|
| | S1 | M1 | L1 | S2 | M2 | L2 | S3 | M3 | L3 |
| 0 ⋮ Ai ⋮ 255 | 0 ⋮ ⋮ 0 | 0 ⋮ ⋮ 0 | 0 ⋮ ⋮ 255 | 0 ⋮ ⋮ 0 | 0 ⋮ ⋮ 0 | 0 ⋮ ⋮ 255 | 0 ⋮ ⋮ 0 | 0 ⋮ ⋮ 0 | 0 ⋮ ⋮ 255 |

⎧‾‾D11‾‾⎫  ⎧‾‾D12‾‾⎫  ⎧‾‾D13‾‾⎫

⇩

After correction

| Input gradation value | Output gradation value | | | | | | | | |
|---|---|---|---|---|---|---|---|---|---|
| | S1 | M1 | L1 | S2 | M2 | L2 | S3 | M3 | L3 |
| 0 ⋮ ACi ⋮ 255 | 0 ⋮ ⋮ 0 | 0 ⋮ ⋮ 0 | 0 ⋮ ⋮ ⋮ | 0 ⋮ ⋮ 0 | 0 ⋮ ⋮ 0 | 0 ⋮ ⋮ ⋮ | 0 ⋮ ⋮ 0 | 0 ⋮ ⋮ 0 | 0 ⋮ ⋮ ⋮ |

S : Small
M : Medium
L : Large

US 7,576,897 B2

METHOD AND DEVICE FOR ACQUIRING INFORMATION FOR COMPENSATING COLOR DRIFT AND MEDIUM WITH PROGRAM FOR THE SAME RECORDED THEREON

BACKGROUND OF THE INVENTION

1. Field of the Invention

The present invention relates to a color correction information acquiring device and a color correction information acquiring method for acquiring color correction information for compensating a color drift in a printing device so designed as to form an image corresponding to printing data on a printing medium using print heads, a printing control device, a printing control method, and a computer-readable medium with a printing control program recorded thereon.

2. Description of the Related Art

Mass-produced ink jet printers are provided with a print nozzle train with respect to each of colors (kinds) of ink. They are provided with a nonvolatile semiconductor memory having ID (error information) recorded thereon for compensating deviation in the weight of ink discharged from each print nozzle train. Any deviation in ink weight is compensated so that the weight of ink discharged from print heads is matched with that of a reference printer (reference unit) by the following procedure: when each printer is subjected to printing control, color correction data such as LUT (LookUp Table) for calibration adapted to ID is created and stored beforehand. Then, the color correction data corresponding to ID is referred to. (Refer to Japanese Unexamined Patent Publication No. Hei 10(1998)-278360, for example.)

At printer production plants, the following calibration operation is performed: with print heads not assembled to a printer, a predetermined number of ink drop is discharged from the print heads, and the ink weight is measured. The difference between the measured ink weight and the corresponding ink weight in a reference printer is correlated to ID, and the correlation is recorded in nonvolatile semiconductor memory.

The operation of measuring the weight of ink discharged from print heads takes some time. Meanwhile, when printers are mass-produced, it is desirable that calibration operation should be quickly performed for cost suppression. In addition, subtle errors are produced in the colors of images printed on printing media because of the following reason or the like: there is slight variation in the voltage applied to print heads when the print heads are assembled to a printer.

Use of ID that represents the result of correlation between colorimetry data from a standard image printed with a mass-produced printer and reference colorimetry data brings the following advantage: deviation in color reproducibility produced in each mass-produced printer from a reference unit is compensated.

However, this poses a problem. In calibration on mass-produced printers, inks must be supplied in correspondence with the respective print heads provided for a plurality of ink kinds. More specific description will be given. Some kinds of ink are expensive; therefore, the cost required for calibration is increased. Calibration cannot be carried out unless all the kinds of ink to be supplied are prepared for the respective print heads.

SUMMARY OF THE INVENTION

The present invention has been made with the above-mentioned problems taken into account. An object of the present invention is to obtain favorable color reproducibility at low cost and little expense in time and effort with respect to printed images.

To attain the above object, one aspect of the present invention is directed to a color correction information acquiring method for acquiring information for compensating a color drift in a printing device that is filled with corresponding ink corresponding to its print head and so designed as to stick the corresponding ink onto a printing medium by the print head and form an image corresponding to printing data there. The color correction information acquiring method is characterized in that:

with the printing device filled with an alternative ink different from the corresponding ink, a standard image is printed on a printing medium with a standard ink recording quantity, and the standard image is subjected to colorimetry in a predetermined color space to acquire alternative colorimetry data.

The acquired alternative colorimetry data is converted into predictive colorimetry data that will be obtained if, with the printing device filled with the corresponding ink, a standard image is printed on a printing medium with the standard ink recording quantity and the printed standard image is subjected to colorimetry in a predetermined color space.

Error information that indicates the result of correlation between the predictive colorimetry data obtained by the conversion and predetermined reference colorimetry data is acquired.

Another aspect of the present invention is directed to a color correction information acquiring device that acquires information for compensating a color drift in the printing device, comprising an alternative colorimetry data acquisition unit and an error information acquisition unit.

The alternative colorimetry data acquisition unit acquires alternative colorimetry data obtained by subjecting a standard image to colorimetry in a predetermined color space, the standard image being printed on a printing medium with a standard ink recording quantity with the printing device filled with an alternative ink different from corresponding ink.

The error information acquisition unit converts the acquired alternative colorimetry data into predictive colorimetry data. Further, it acquires error information indicating the result of correlation between the predictive colorimetry data and the predetermined reference colorimetry data. The predictive colorimetry data cited here refers to colorimetry data obtained by printing a standard image on a printing medium with the standard ink recording quantity with the printing device filled with the corresponding inks, and subjecting the standard image to colorimetry in a predetermined color space. It can be said that the error information indicates the degree of a color drift of the predetermined corresponding inks in the printing device. If such error information is acquired with respect to each printing device, the following advantage is brought: when printing process is carried out with each printing device based on any printing data, predetermined color correction can be carried out on printing data using the error information; further, a printing device-specific color drift can be compensated. Needless to add, error information can be acquired with respect to each corresponding ink applicable to the printing device. (Error information can be acquired with respect to each print head corresponding to each corresponding ink.)

As mentioned above, the following can be implemented by acquiring the result of correlation with the print heads of the printing device filled with an alternative ink, even if corresponding inks that are filled under normal conditions are not filled: error information for compensating a color drift produced in each of the corresponding inks in the printing device can be acquired. (In other words, error information for compensating a color drift produced in each print head corresponding to each corresponding ink can be acquired.) Therefore, error information for compensating a color drift produced in each printing device can be acquired at little expense in time and effort and low cost.

As mentioned above, error information for compensating a color drift in the printing device is acquired based on alternative colorimetry data from a standard image actually printed on a printing medium with the printing device. Therefore, subtle deviation in the colors of printed images due to slight variation in voltage applied to print heads when the print heads are assembled to a printer or for other like reasons is not produced. Therefore, the color reproducibility of printed images with respect to reference colors can be made more favorable than in conventional cases where only the ink weight is compensated.

If the printing device is a device that has a plurality of print heads corresponding to a plurality of kinds of corresponding inks and is further so designed as to discharge a plurality of kinds of the corresponding inks onto a printing medium from a plurality of the print heads to print an image, the alternative colorimetry data may be acquired by adopting the following constitution: any ink of a plurality of kinds of the corresponding inks is taken as the alternative ink, and the printing device is filled with the alternative ink in place of the corresponding inks excluding the alternative ink; a standard image printed on a printing medium with the standard ink recording quantity with this printing device; and the alternative colorimetry data acquisition unit acquires the alternative colorimetry data by subjecting the standard image to colorimetry in the predetermined color space. Thus, error information can be acquired with respect to each of the corresponding inks used in a printing device.

The error information acquisition unit may compute error information from the result of correlation between the following pieces of data: the predictive colorimetry data; and the reference colorimetry data obtained by printing an image with the standard ink recording quantity with a predetermined reference printing device filled with the corresponding inks, and subjecting the printed image to colorimetry in a predetermined color space. Error information that serves as an index for accurately compensating a color drift of the corresponding inks of the printing device from those of a reference printing device can be acquired by taking the following measure: the above-mentioned reference colorimetry data is provided beforehand, and error information is determined according to the result of correlation between predictive colorimetry data as the reduced value of alternative colorimetry data and reference colorimetry data.

A color space in which a plurality of color components are taken as color component quantities can be used for the predetermined color space. Various combinations are possible for the color space, color components, and color component quantities. For the CIE L*a*b* color space defined by the Centre International de l'Echairage (CIE: International Commission on Illumination), they are the L*, a*, and b* color components and their respective values; for the CIE L*u*v* color space, they are the L*, u*, and v* color components and their respective values; for the CIE XYZ color space, they are the X, Y, and Z color components and their respective values; for the RGB color space, they are the R, G, and B color components and their respective values; and the like. Here, L* is an element color representing lightness (brightness), and a*, b*, u*, and v* are element colors representing hue and color saturation. In the following description, notation "*" will be omitted.

The error information acquisition unit may carry out conversion from the alternative colorimetry data into the predictive colorimetry data by the following: conversion from the color component quantity of the color component quantities constituting the alternative colorimetry data that most drastically changes with change in the ink recording quantity of alternative ink into the color component quantity of the color component quantities constituting the predictive colorimetry data that most drastically changes with change in the ink recording quantity of the predetermined corresponding ink. Thus, alternative colorimetry data is converted into predictive colorimetry data to acquire error information according to the correspondence between only the color component quantities that most drastically change with change in ink recording quantity. Therefore, error information that appropriately reflects color drifts in the corresponding inks can be acquired. As mentioned above, alternative colorimetry data is converted into predictive colorimetry data to acquire error information according to the correspondence between only the color component quantities that most drastically change. Therefore, the acquiring process is accelerated.

As another constitution of the present invention, a color correction information acquiring device may be constructed so that the following operation is performed: a comparison printing device develops variation in the quantity of ink stuck to a printing medium as compared with the reference printing device; the comparison printing device is loaded with print heads for the predetermined corresponding inks filled with the alternative ink; a standard image is printed on a printing medium with the standard ink recording quantity with this comparison printing device; this standard image is subjected to colorimetry to acquire comparison alternative colorimetry data; at the same time, a plurality of pieces of comparison alternative interpolation data corresponding to the standard ink recording quantity is computed by interpolation based on the comparison alternative colorimetry data.

Further, a plurality of pieces of interpolation predictive colorimetry data corresponding to the standard ink recording quantity may be computed as follows: the comparison printing device is loaded with the print heads for the predetermined corresponding inks filled with the corresponding inks; an image is printed on a printing medium with the standard ink recording quantity with this comparison printing device; the printed image is subjected to colorimetry to acquire comparison colorimetry data, and further interpolation is carried out based on the comparison colorimetry data. A plurality of pieces of such interpolation predictive colorimetry data become candidate values for the predictive colorimetry data. The number of comparison printing devices is arbitrary, and, for example, the following printing devices may be used as comparison printing devices: a printing device larger in the quantity of ink stuck to a printing medium as compared with a reference printing device; and a printing device smaller in the quantity of ink stuck to a printing medium as compared with the reference printing device.

The error information acquisition unit brings each comparison alternative interpolation data into correspondence with each interpolation predictive colorimetry data to generate the relation for conversion beforehand. Comparison alternative interpolation data substantially matched with the alternative colorimetry data is converted into certain interpolation predictive colorimetry data according to the relation for conversion. The converted interpolation predictive colorimetry data is taken as predictive colorimetry data. As a result, the alternative colorimetry data is uniquely converted into certain predictive colorimetry data.

With this constitution, the alternative colorimetry data whose value can change from printing device to printing device as object of error information acquiring process can be easily and uniquely converted into predictive colorimetry data according to its value. For this reason, the following advantage is brought: the result of correlation between predictive colorimetry data and the reference colorimetry data also always takes a value corresponding to a color drift of the predetermined corresponding ink in the printing device. Thus, error information most suitable for compensating the color drift can be acquired without fail.

In the above description, a plurality of pieces of comparison alternative interpolation data are computed by interpolation based on comparison alternative colorimetry data acquired form the print result of the comparison printing device. In the above interpolation, the following procedure may be taken: the reference printing device is loaded with print heads for the predetermined corresponding ink filled with the alternative ink; a standard image is printed on a printing medium with the standard ink recording quantity with this reference printing device; the printed standard image is subjected to colorimetry to acquire colorimetry data, and this colorimetry data is added as reference points. As a result, the accuracy of interpolation on comparison alternative interpolation data is enhanced.

The following procedure may be similarly taken also when a plurality of pieces of interpolation predictive colorimetry data is subjected to interpolation: in addition to the comparison alternative colorimetry data, the reference colorimetry data is taken as reference points for interpolation. As a result, the accuracy of interpolation on interpolation predictive colorimetry data is enhanced.

If the printing device is a device so designed as to form a predetermined number of kinds of dots, different in ink quantity, on the printing medium from the print heads, the error information may be acquired with respect to each of the kinds of dots. This is because of the following: where a plurality of kinds of dots, such as large dot, medium dot, and small dot, can be discharged, a color drift to be compensated differ from dot kind to dot kind even if error information is acquired with respect to a certain corresponding ink.

If the standard ink recording quantity differs depending on the kind of dot, the following constitution may be adopted: the standard ink recording quantity is decreased with increase in the ink quantity of the dot. The ink recording quantity that largely differs from colorimetry data to colorimetry data due to variation in the quantity of ink stuck to a printing medium that occurs from printing device to printing device is different depending on the kind of dot. It tends to be decreased with increase in the ink quantity of dot. Therefore, if an ink recording quantity with which a definite difference in colorimetry data due to variation in ink quantity can be obtained with respect to each of the kinds of dots is taken as the standard ink recording quantity, as described above, the following advantage is brought: error information that appropriately reflects color drifts that occur on a dot kind-by-dot kind basis in the printing device can be acquired.

The number of kinds of ink used as the alternative ink can be made smaller than the number of kinds of corresponding ink applicable to the printing device. As an example, it will be assumed that six kinds of ink are used as corresponding inks. In this case, one of them may be taken as the alternative ink, and, in the process of acquiring color correction data, each print head may be filled with the alternative ink. Needless to add, the number of kinds of alternative ink used is not limited to one. As a result, the cost, time, and effort for an error information acquiring process can be reduced.

Here, the invention can be grasped as a printing control device that carries out color correction on printing data that represents any image, using the constitution for acquiring the error information when printing operation is performed. More specific description will be given. The invention can be constituted as a printing control device that carries out printing control on a printing device filled with corresponding inks corresponding to its print heads and so designed as to stick the corresponding inks onto a printing medium through the print heads to form an image corresponding to printing data. The printing control device comprises: the alternative colorimetry data acquisition unit, the error information acquisition unit, a color correction data determination unit, and a printing control unit.

The color correction data determination unit determines color correction data for compensating a color drift of the predetermined corresponding inks in the printing device according to the values of the error information. The printing control unit uses the color correction data, and thereby carries out such control that the following is implemented: printing data that represents an image is corrected into printing data for compensating a color drift in a printed image printed with the printing device; and the printing device is caused to print a printed image corresponding to the corrected printing data. With this constitution, the color reproducibility of printed images outputted from a printing device can be enhanced with respect to reference colors.

As another constitution of the printing control device, the following may be adopted: a predetermined reference printing device and a comparison printing device that develops variation in the quantity of ink stuck to a printing medium as compared with the reference printing device are respectively filled with the corresponding inks. Images are printed on printing media with a predetermined ink recording quantity with these printing devices; the printed images are subjected to colorimetry in the predetermined color space to obtain colorimetry data; color correction data for compensating a color drift in colorimetry data from an image printed with the comparison printing device from the colorimetry data of the reference printing device is generated based on the above colorimetry data; and a storage area in which the generated color correction data is stored in correspondence with predetermined error information is provided.

The color correction data determination unit operates so that the following is implemented: when error information acquired by the error information acquisition unit is matched with the predetermined error information, the stored color correction data is taken as color correction data for compensating a color drift of the predetermined corresponding inks. That is, if the characteristics of a color drift in the printing device are the same as those in a comparison printing device, color correction data to be acquired is also the stored color correction data.

In some cases, the acquired error information may not be matched with the predetermined error information, needless to add. If color correction data is prepared beforehand according to the number of pieces of error information expected to be acquired by the error information acquisition unit, much time and effort are required, and much memory resource is required as well. Consequently, the stored color correction data is corrected according to the values of the acquired error information; and corrected color correction data obtained by this correction is taken as color correction data for compensating a color drift of the predetermined corresponding inks.

Thus, with this constitution, color correction data required for compensating a color drift of the predetermined corresponding inks in a printing device subjected to printing control can be easily acquired based on the error information without fail.

As still another aspects, the above-described color correction information acquiring device and printing control device involves various modes, including a mode in which they are incorporated in some equipment and implemented together with any other method. For example, the present invention can also be applied as a printing system comprising a printing control device and a printing device. The above processing can also be carried out by taking predetermined procedures corresponding to the configuration of the device. Therefore, the present invention is also applicable as a control method, and the method produces the same action and effect as described above. In some cases, a control program is executed on the device. Therefore, the present invention is also applicable as a program, a computer-readable recording medium with the program recorded thereon, or a program product. These produce the same action and effect as described above.

Other and further objects, features and advantages of the invention will appear more fully from the following description.

BRIEF DESCRIPTION OF THE DRAWINGS

FIG. 10 is a drawing schematically illustrating the structure of correspondence data.

FIG. 11 is a drawing schematically illustrating the structure of a standard recording rate table.

FIG. 16 is a drawing schematically illustrating the structure of a dot allocation table.

DETAILED DESCRIPTION

Figure 1:
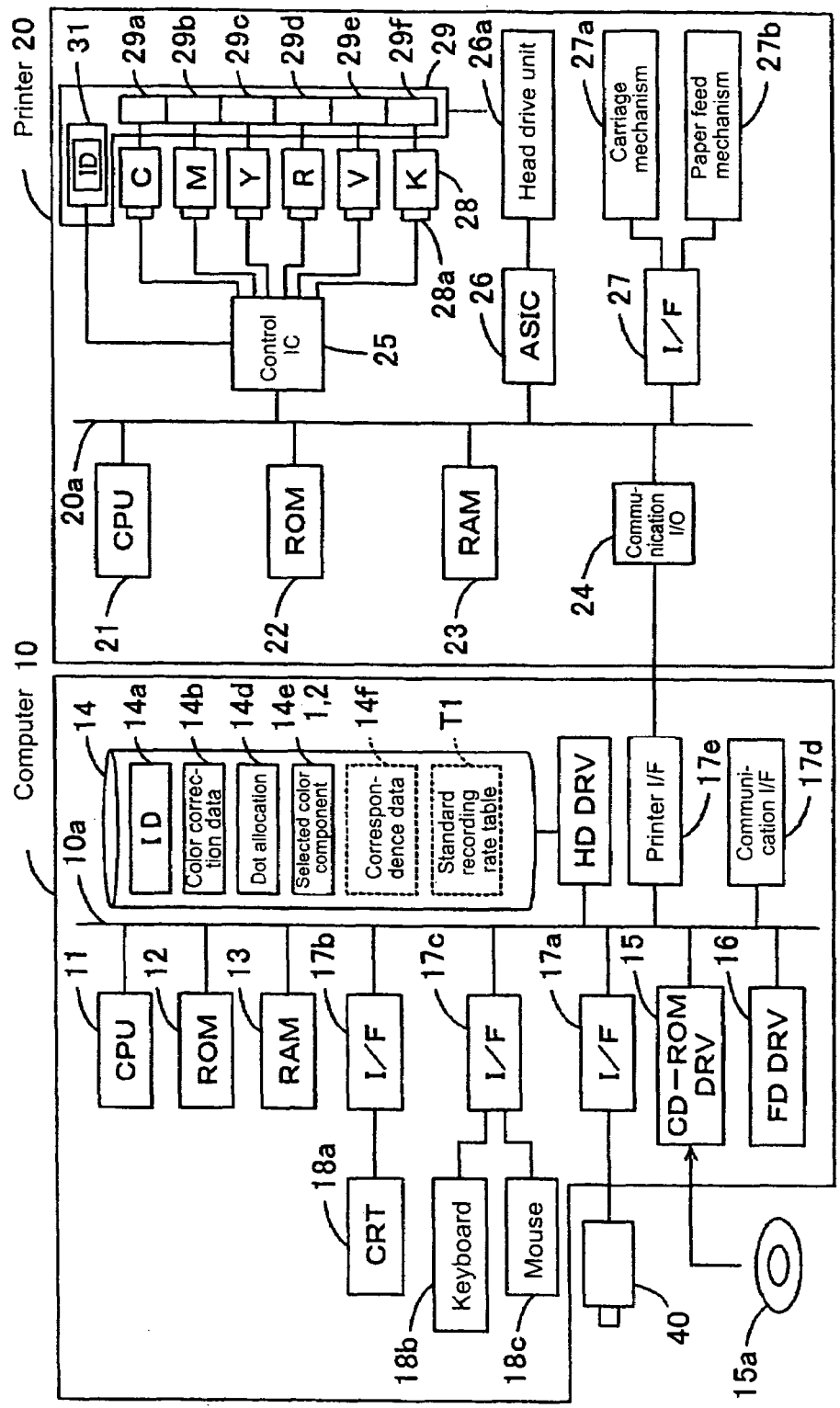
FIG. 1 is a block diagram illustrating the configurations of a printing control device and a color correction information acquiring device.

Hereafter, description will be given to embodiments of the present invention in the following order:
(1) General Configuration of Device according to the Invention:
(2) Description of Error Information Acquiring Process:
(3) Description of Printing Control Process:
(4) Modifications:

(1) General Configuration of Device According to the Invention:

FIG. 1 illustrates a computer 10, a printer 20, and the like that constitute a printing control device and a color correction information acquiring device according to the present invention.

In the computer 10, a CPU 11 that serves as the nerve center of computation controls the whole of the computer 10 through a system bus 10a. The bus 10a is connected with a ROM 12 that is a non-erasable semiconductor memory, an RAM 13 that is an erasable semiconductor memory, a CD-ROM drive 15, a flexible disk (FD) drive 16, various interfaces (I/F) 17a to 17e, and the like. It is also connected with a hard disk (HD) 14 that is a magnetic disk through a hard disk drive.

The HD 14 stores an operating system (OS), application programs (APL), and the like, and these are transferred to the RAM 13 and executed by the CPU 11 as appropriate. In this embodiment, the HD 14 is constructed as a predetermined storage area where the following are stored: the printing control program of the present invention; ID 14a acquired from a printer; a plurality of pieces of color correction data 14b constructed as one-dimensional LUTs; color conversion LUTs (color conversion tables); dot allocation tables 14d; and the like. The I/F 17a (e.g. USB I/F) is connected with a colorimeter 40. The colorimeter 40 is capable of acquiring as color component quantities (color values) a plurality of color components L, a, and b based on the Lab color system in compliance with the CIE (1976) standard. This is done by aiming its color detection unit 40a at an object subjected to colorimetry. It is capable of outputting the acquired color component quantities L, a, and b to the computer 10. The CIE Lab color space (predetermined color space) is a uniform color space that has a plurality of color components L, a, and b as color component quantities and is device-independent. Needless to add, the color space in which colorimetry is carried out may be the CIE XYZ color space, CIE Luv color space, RGB color space, or the like.

The CRT I/F 17b is connected with a display 18a that displays an image corresponding to color image data based on the data. The input I/F 17c is connected with a keyboard 18b and a mouse 18c as input devices for operation. The printer I/F 17e is connected with the printer 20 through, for example, a serial I/F cable.

The printer (printing device) 20 discharges inks in six colors filled in respective ink cartridges 28 respectively provided in correspondence with the C, M, Y, R, V, and K (Cyan, Magenta, Yellow, Red, Violet, and black) colors from its print heads 29a to 29f. Thus, the printer sticks the inks onto printing paper (printing medium) to form dots, and thereby forms a printed image corresponding to printing data. Needless to add, a printer that uses light cyan, light magenta, light black, dark yellow, uncolored ink, and the like may be adopted. In addition, the number of kinds of ink need not be six. Other various printing devices can be adopted. Such printing devices include bubble-type printer so designed as to produce bubbles in ink passages to discharge ink; and laser printer that uses toner ink to print a printed image on a printing medium.

The ink used in a printing device may be of liquid or of solid. The individual inks in this embodiment are inks prepared by mixing color materials consisting of fine pigment with water-based solvent. Instead, inks with color material consisting of dye mixed or inks using oil-based solvent may be used.

In the printer 20, a CPU 21, ROM 22, RAM 23, communication I/O 24, control IC 25, ASIC 26, I/F 27, and the like are connected with one another through a bus 20a. The CPU 21 controls each part according to programs written in the ROM 22.

A carriage that is reciprocated in the direction of main scanning by a carriage mechanism 27a is loaded with the ink cartridges 28, and further mounted with a print head unit (aggregate of print heads) 29. The unit 29 is provided with the print heads 29a to 29f provided for six kinds of ink, or the C, M, Y, R, V, and K inks (corresponding inks), and a nonvolatile semiconductor memory 31. For this memory 31, an EEPROM or the like can be used, and the memory is so designed as to record color adjustment ID (error information) and the like used for correcting printing data on the computer 10 side. The print heads 29a to 29f are respectively capable of discharging predetermined corresponding inks and sticking them onto printing paper. Each cartridge 28 has an ink chamber filled with corresponding ink in liquid form, and corresponding inks are supplied from the ink chambers to the respective print heads 29a to 29f. When ink cartridges filled with inks are set in the cartridge holder of a printer, it means that the printer has been filled with ink. Each cartridge 28 is provided with a memory chip 28a comprising, for example, a RAM, and each memory chip 28a is electrically connected with the control IC 25.

The communication I/O 24 is connected with the printer I/F 17e of the computer 10, and the printer 20 receives color-by-color raster data transmitted from the computer 10 through the communication I/O 24. The ASIC 26 outputs applied voltage data corresponding to raster data to a head drive unit 26a while transmitting and receiving predetermined signals to and from the CPU 21. The head drive unit 26a generates applied voltage patterns to the piezo elements built in the print heads 29a to 29f from the applied voltage data. It causes the print heads 29a to 29f to discharge inks in respective colors on a dot-by-dot basis. The carriage mechanism 27a and a paper feed mechanism 27b connected with the I/F 27 cause the print head unit 29 to make a main scanning or feed printing paper in succession and made a sub-scanning while performing page ejecting operation as necessary.

Each of the print heads 29a to 29f is provided with a plurality of ink jet nozzles, and a piezo element is disposed in correspondence with each of the nozzles.

Figure 2:
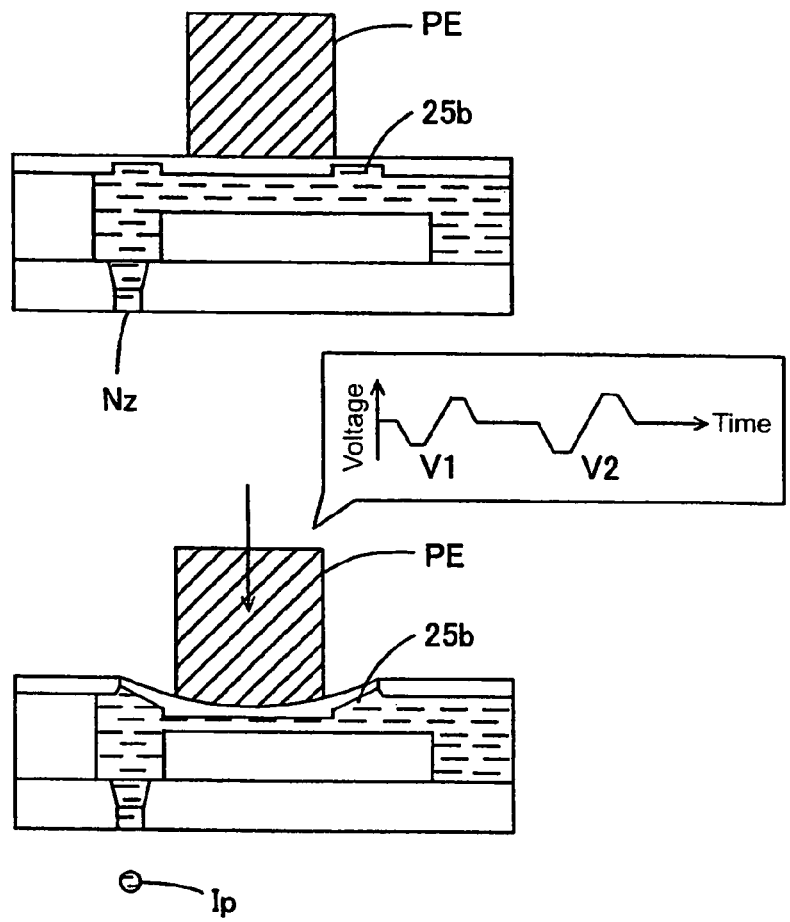
FIG. 2 is a drawing illustrating a nozzle and its internal structure in enlarged form.

As illustrated in FIG. 2, the piezo element PE is installed in a position where it adjoins the ink passage 25b for guiding ink to the nozzle Nz. When a voltage having a predetermined time width is applied to between the electrodes provided at both the ends of the piezo element PE, the piezo element is expanded only for the voltage application time. Thus, it deforms one side wall of the ink passage 25b. As a result, the volume of the ink passage 25b is reduced correspondingly with the expansion of the piezo element PE. Ink in the quantity equivalent to the reduced volume is discharged from the tip of the nozzle Nz at high speed in the form of ink droplet Ip. The ink penetrates a printing medium, and a dot is thereby formed. Thus, printing operation is performed.

The drawing shows driving waveforms for forming a predetermined number of kinds of dots, different in ink quantity. Dots different in ink quantity are formed by driving waveforms V1 and V2 during a predetermined period. The degree of expansion and contraction of a piezo element is increased with increase in the voltage difference between the driving waveforms. Therefore, dots are more enlarged with increase in voltage difference. As illustrated at the lower part of the drawing, the printer 20 is capable of forming three kinds of dots, roughly classified large, medium, and small ink quantities, on a printing medium. (The ink quantity is ink weight, for example. It may be ink volume.) It is capable of further forming three different kinds of dots, different in ink quantity, on a printing medium with respect to each of the large, medium, and small dots. Therefore, the printer 20 discharges ink droplets Ip whose ink quantity differs in a plurality of stages from the same print head for each color. Thus, it forms dots whose size corresponds to the ink quantities in a plurality of stages. Identification information for identifying the kinds of dots in nine different kinds (predetermined number) is added to raster data transmitted from the computer 10 to the printer 20. The printer 20 forms dots in kinds corresponding to the identification information. When raster data comprising dot data that represents the kinds of dots on a raster-by-raster basis is inputted, the printer 20 forms a plurality of kinds of dots, different in ink quantity, on a printing medium in correspondence with the raster data.

In the computer 10, a printer driver for controlling the printer I/F 17e and the like are installed in the OS, and the driver and the like carry out varied control. The APLs communicate data and the like with hardware through the OS. The printer driver is started when the printing function of an APL is carried out. It can carry out two-way communication with the printer 20 through the printer I/F 17e, and it receives printing data from APLs through the OS, converts it into raster data, and sends out the raster data to the printer 20.

The printing control program and the color correction information acquisition program of the present invention may be constructed of OS, APL, or OS and APL. The medium with these programs recorded thereon may be, other than the HD14, CD-ROM 15a, FD, semiconductor memory, or the like. The program of the present invention may be executed by connecting the communication I/F 17d to the Internet, and downloading it from a predetermined server.

Figure 3:
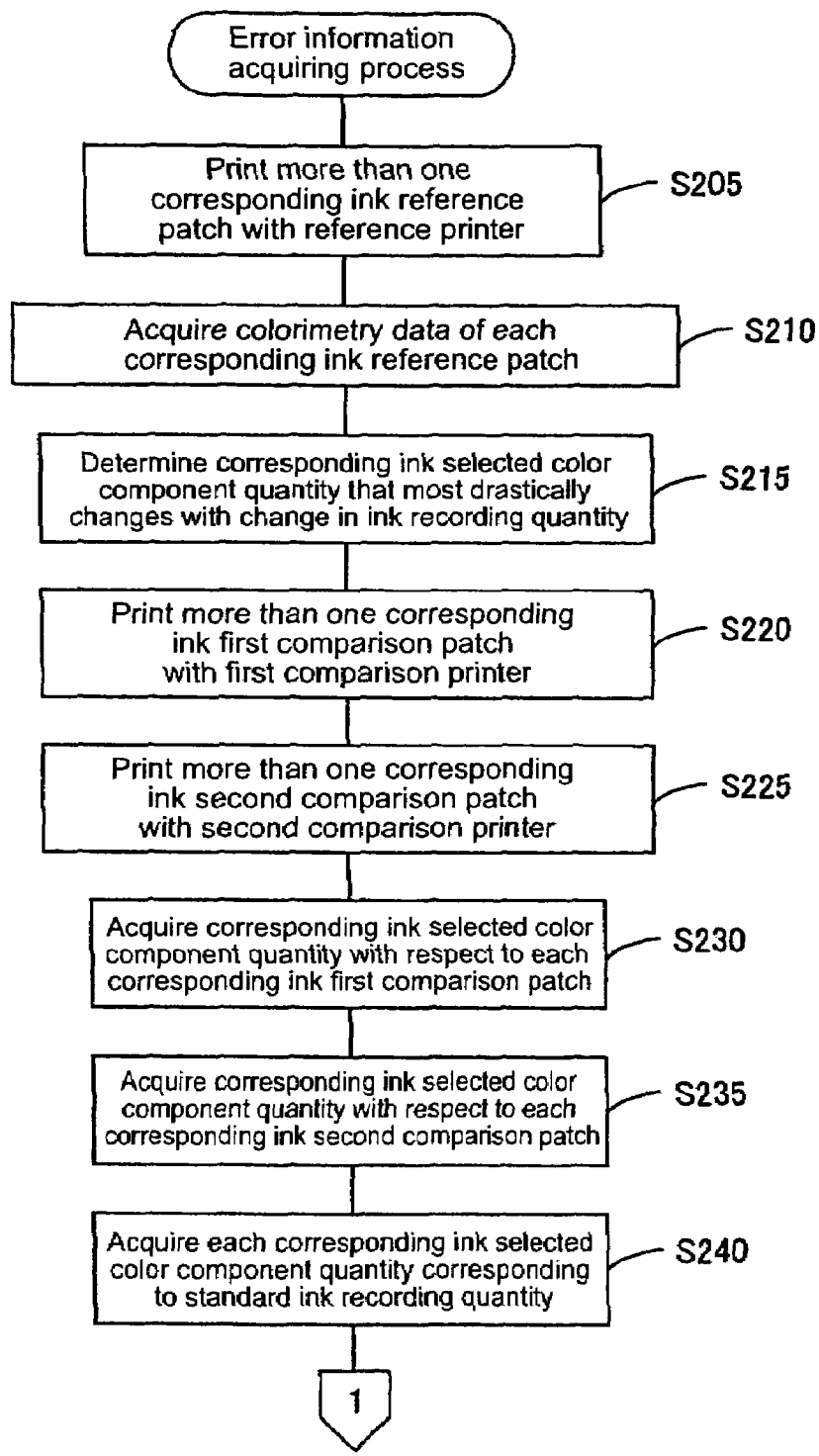
FIG. 3 is a flowchart illustrating part of error information acquiring process.
Figure 4:
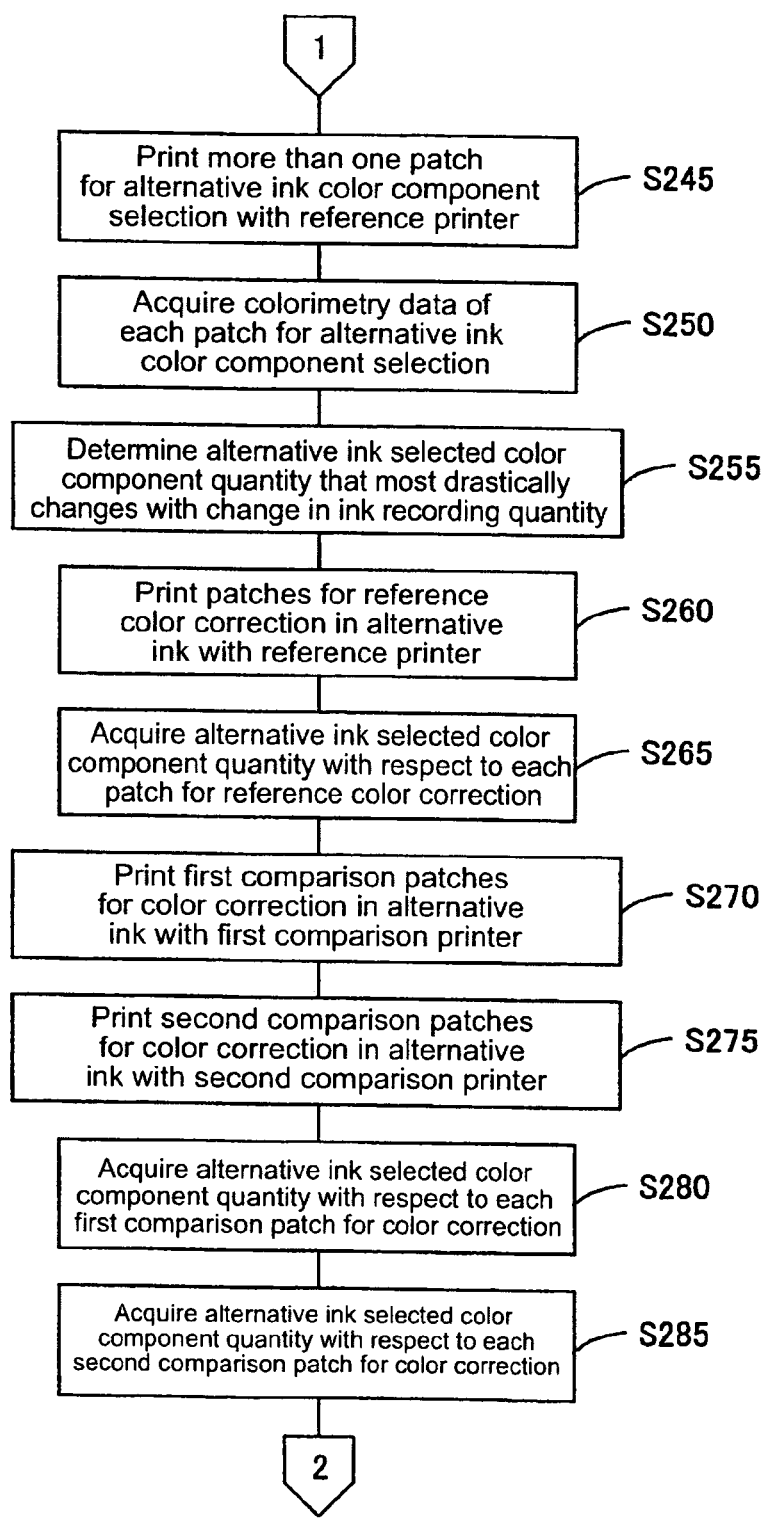
FIG. 4 is a flowchart illustrating part of the error information acquiring process.
Figure 5:
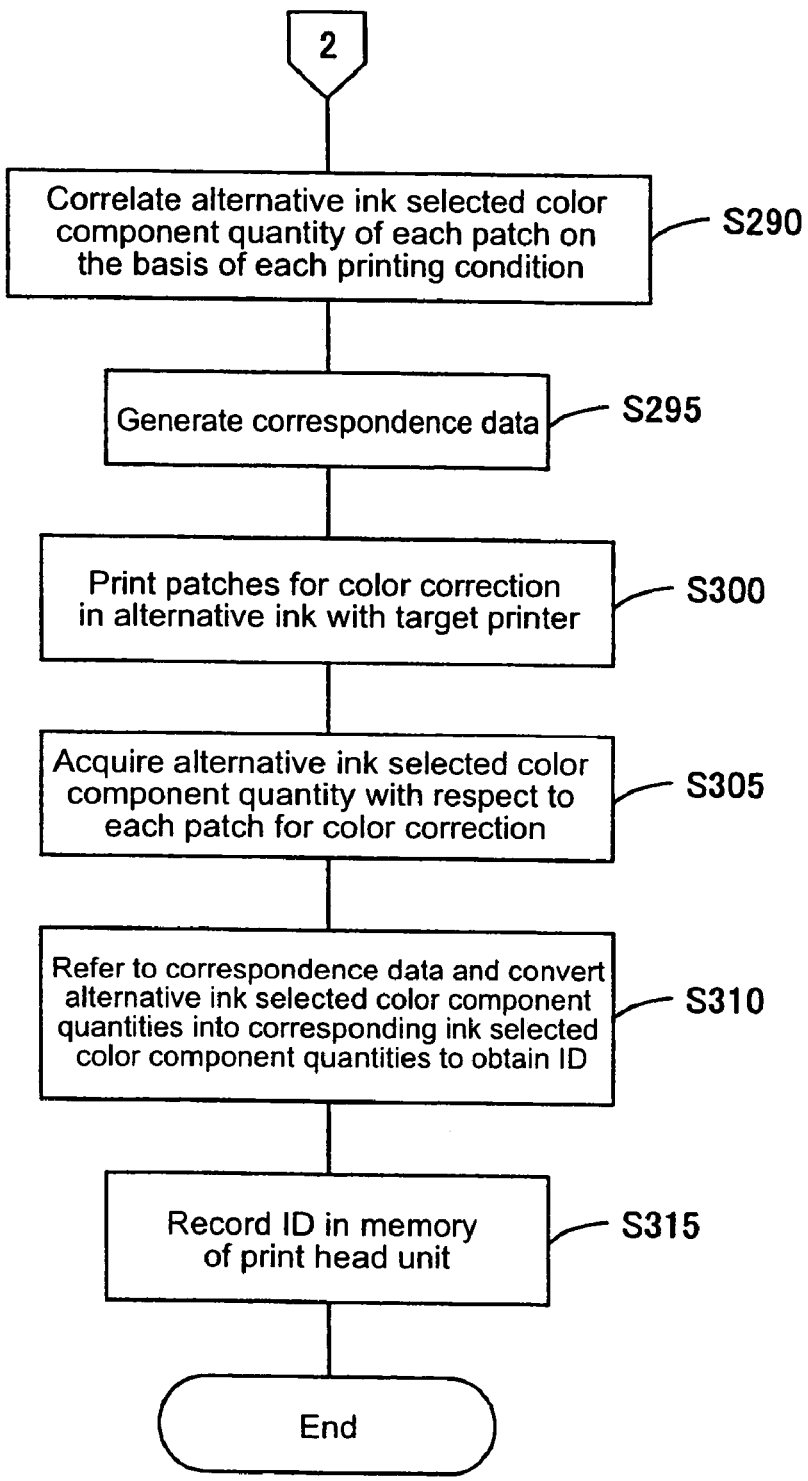
FIG. 5 is a flowchart illustrating part of the error information acquiring process.
Figure 6:
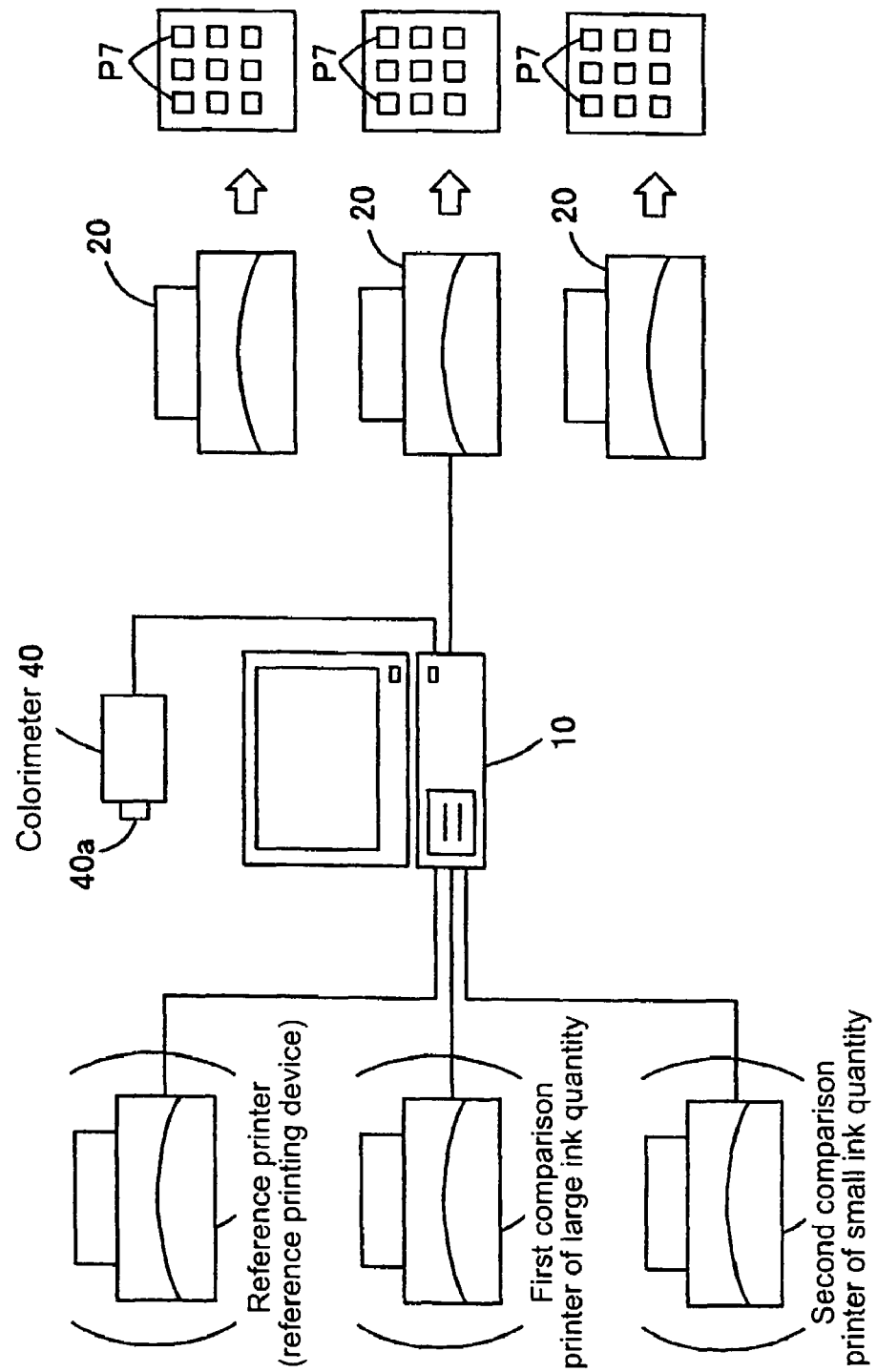
FIG. 6 is a block diagram roughly illustrating a system for error information acquiring process.
Figure 18:
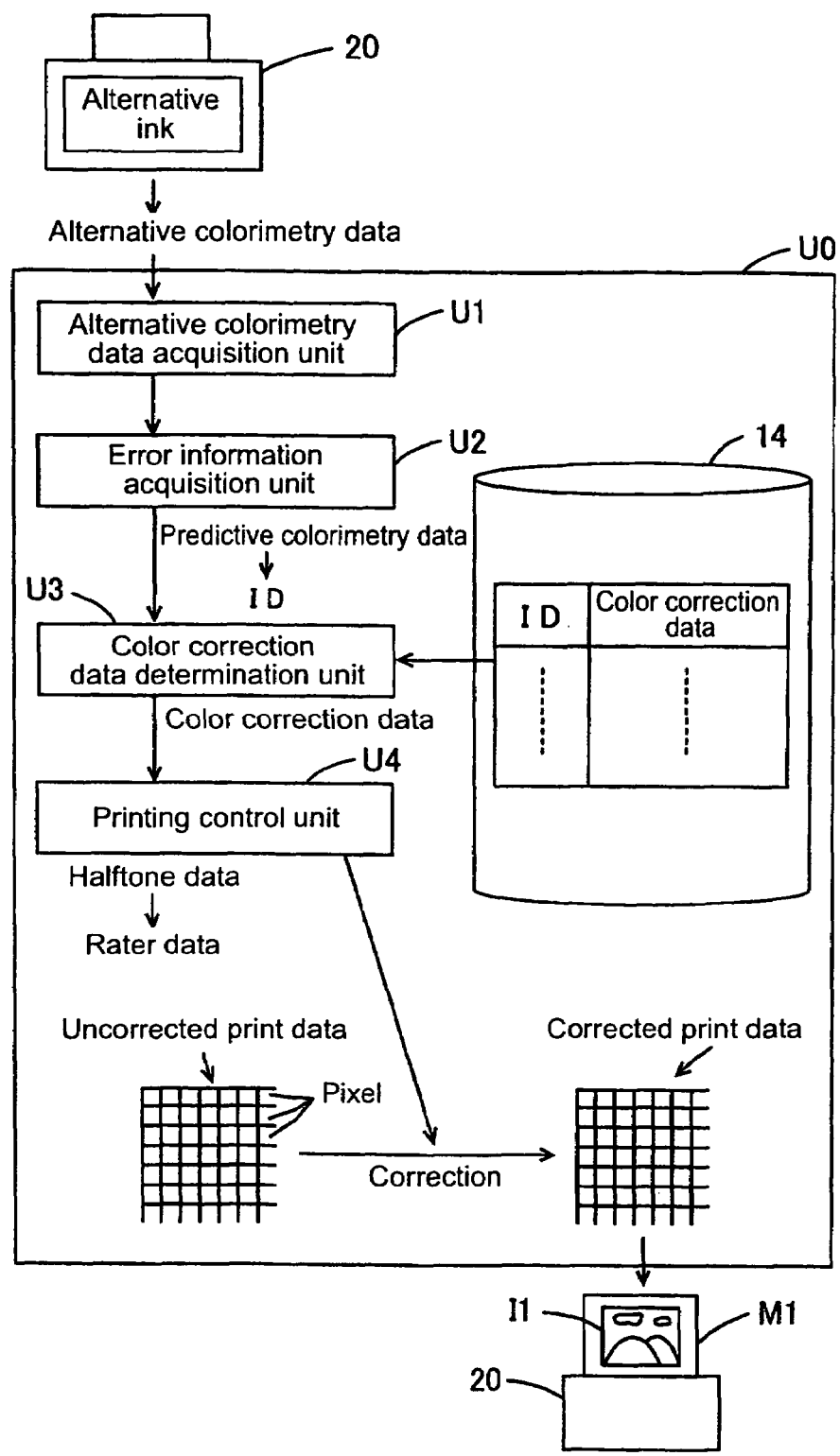
FIG. 18 is a drawing schematically illustrating the configuration of a printing control device.

(2) Description of Error Information Acquiring Process:

FIGS. 3 to 5 are flowcharts illustrating the error information acquiring process carried out by the computer 10; FIG. 6 is a block diagram roughly illustrating a system suitable for carrying out the error information acquiring process; and FIG. 18 is a drawing schematically illustrating the configuration of a printing control device.

A printing control device U0 comprises various units U1 to U4 and a storage area (HD) 14, and carries out printing control on a printer 20. The color correction information acquiring device is included in the printing control device U0. It comprises an alternative colorimetry data acquisition unit U1 and an error information acquisition unit U2, and acquires ID (error information) for compensating a color drift in the printer 20.

The alternative colorimetry data acquisition unit U1 acquires alternative colorimetry data obtained by taking the following procedure: the printer 20 is filled with alternative ink different from corresponding inks, and patches (standard images) are printed on a printing medium with a standard ink recording quantity; the printed patches are subjected to colorimetry in a predetermined color space. The error information acquisition unit U2 converts alternative colorimetry data into predictive colorimetry data first. The predictive colorimetry data is data that will be obtained when the following procedure is taken: the printer 20 is filled with corresponding inks, and patches (standard images) are printed on a printing medium with the standard ink recording quantity. The printed patches are subjected to colorimetry in a predetermined color space. Next, the error information acquisition unit U2 acquires ID that represents the result of correlation between the predictive colorimetry data acquired by the above conversion and predetermined reference colorimetry data.

A color correction data determination unit U3 determines color correction data for compensating a color drift of corresponding inks in the printer 20 according to the value of ID. The HD 14 stores a color correction data table in which color correction data is placed in correspondence with error information. The color correction data determination unit U3 refers to the color correction data table, and determines color correction data corresponding to ID. A printing control unit U4 uses the determined color correction data and carries out such control that the following is implemented: uncorrected printing data that represents an image is corrected into printing data that compensates a color drift in an image I1 printed with the printer 20; halftone data and raster data are generated in this order; and the printing device is caused to print an image I1 corresponding to the corrected printing data. Thus, the printer 20 forms a printed image I1 with the color drift compensated on a printing medium M1.

The system for acquiring error information, illustrated in FIG. 6, is constructed on the assumption that it is used in printer production plants. The computer 10 is connected with a colorimeter 40, and further connected with printers 20 to be calibrated (hereafter, also referred to as "target printers") in succession. Each target printer 20 prints patches for color correction (standard images) P7 in alternative ink different from corresponding inks as appropriate. The computer 10 is connected with the following printers as required: a reference printer that serves as the reference; a first comparison printer larger in the quantity of ink stuck to a printing medium than the reference printer; and a second comparison printer smaller in the quantity of ink stuck to a printing medium than the reference printer. Each target printer 20 is calibrated with a color of a printed image reproduced on a printing medium with the reference printer taken as the reference color. All of the reference printer, first comparison printer, and second comparison printer are of the same model as the target printers 20.

At Step S205 of FIG. 3 (hereafter, the wording "Step" will be omitted), the reference printer is connected to the computer 10. In order that a predetermined corresponding ink (e.g. Y) is discharged from a print head (print head 29c) corresponding to the corresponding ink, the ink cartridge 28 filled with the corresponding ink is loaded in the proper loading place. The computer 10 is caused to carry out such control that the following is implemented: a plurality of corresponding ink reference patches (standard images) P0 are printed on a printing medium in a predetermined kind of dot with the ink recording quantity varied in a plurality of stages. In this case, the CPU 11 acquires predetermined image data for patches that represents a plurality of patches corresponding to a plurality of states of dot recording rate, stored beforehand in the HD 14, and temporarily stores the image data in the RAM 13. The patch is also designated as color chip, and a color chart is comprised of a plurality of patches formed on a printing medium. The image data for patches is data in which patches in solid color are represented by a large number of pixels with a gradation. The image data for patches is subjected to predetermined halftone process and rasterizing process, and the generated rasterize data is sent out to the reference printer. Thus, such control as to cause the reference printer to print a plurality of the corresponding ink reference patches P0 corresponding to the image data for patches is carried out.

Figure 7:
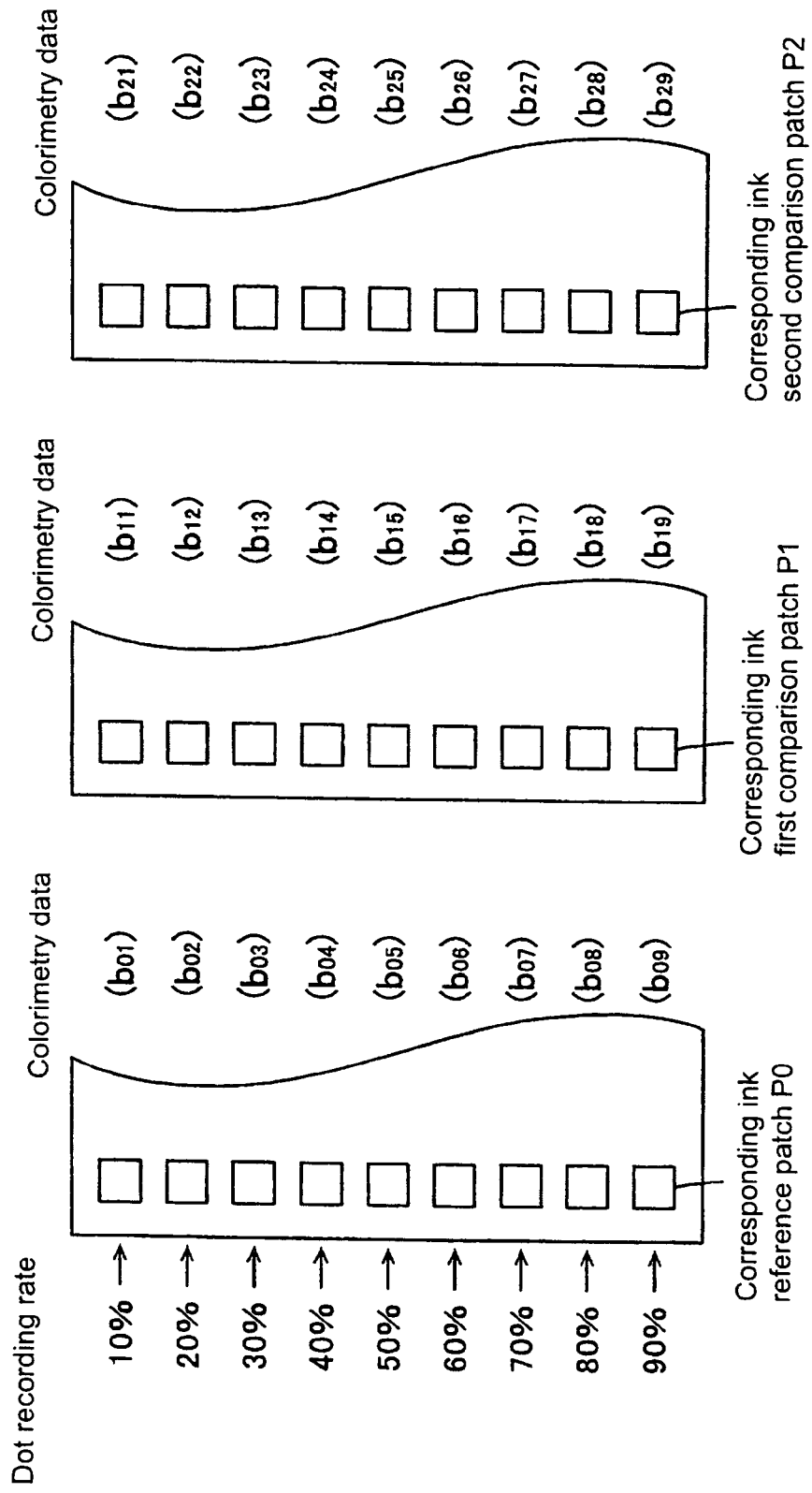
FIG. 7 is an explanatory drawing illustrating a plurality of patches printed in corresponding ink in each printer.

The left part of FIG. 7 illustrates a case where corresponding ink reference patches P0 in nine stages of dot recording rate between 10% and 90% inclusive in increments of 10% are printed in large dot 1 of the Y ink with the reference printer. The dot recording rate refers to the ratio of the number of dots formed to the total number of pixels in a predetermined area on a printing medium, and it is a kind of ink recording quantity.

At S210, each of the patches P0 is subjected to colorimetry using the colorimeter 40, and the computer 10 acquires the colorimetry data of each patch P0.

At S215, the following color component quantity is selected from among a plurality of color component quantities L, a, and b constituting colorimetry data based on the colorimetry data and the dot recording rate of each patch P0: the color component quantity that most drastically changes with change in dot recording rate. The selected color component quantity is specified as corresponding ink selected color component quantity. Then, the data 14e1 representing the specified corresponding ink selected color component is stored on the HD 14.

Figure 8:
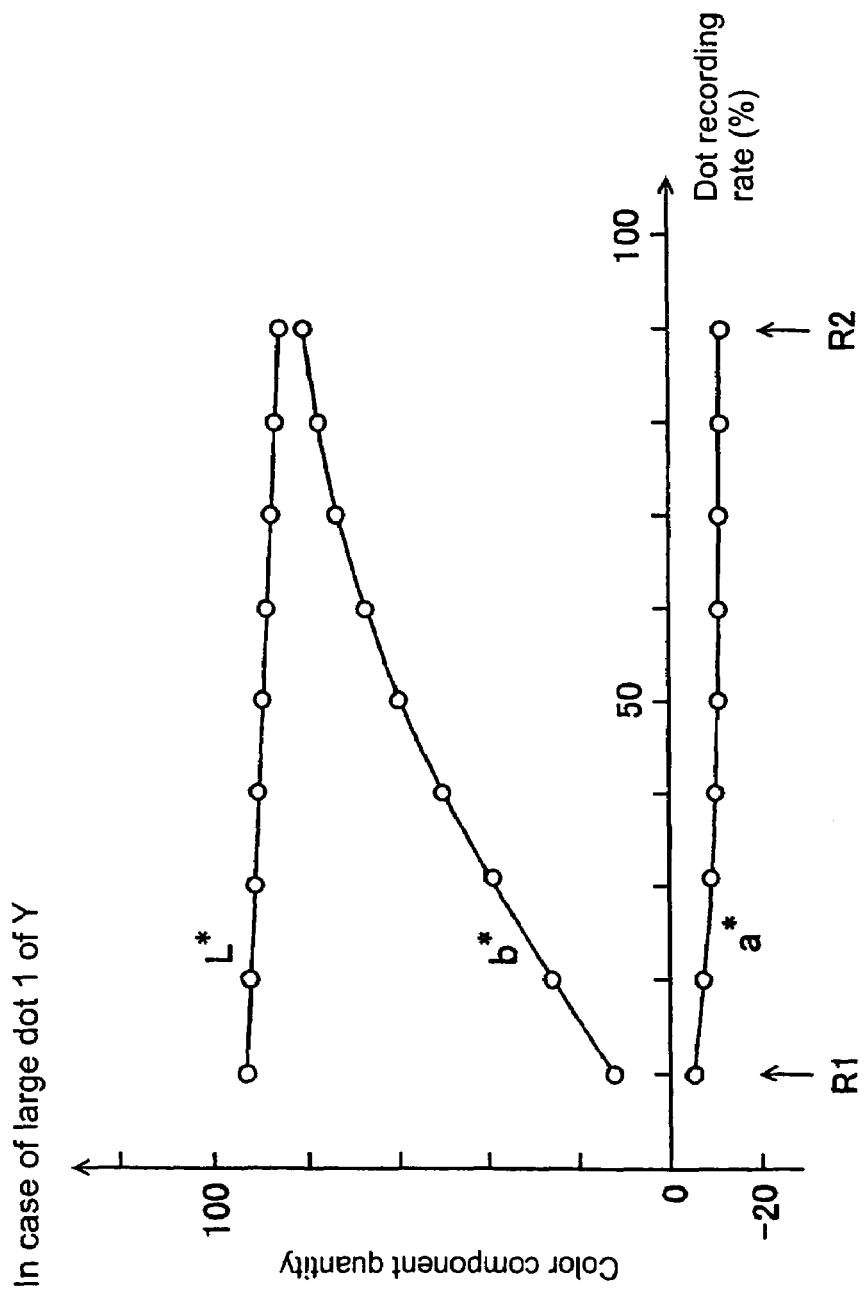
FIG. 8 is a drawing illustrating an example of the result of colorimetry on color component quantities L, a, and b versus dot recording rate.

FIG. 8 illustrates an example of the result of the following operation: with respect to large dot 1 of Y, patches with individual dot recording rates are printed on glazed paper, and the printed patches are subjected to colorimetry in the Lab color space. In this figure, the horizontal axis represents dot recording rate (unit: %), and the vertical axis represents L-quantity, a-quantity, and b-quantity that define the Lab color space. In this example in the figure, of the color component quantities L, a, and b, the b-quantity most drastically changes with change in dot recording rate. This b-quantity is taken as the corresponding ink selected color component quantity, and is specified as the color component quantity for printing data correction.

An example will be taken. With respect to color and dot kind that specify a corresponding ink selected color component quantity, the following assumption will be made: R1 and R2 are taken for dot recording rates different from each other; L1, a1, and b1 are respectively taken for color component quantities L, a, and b obtained when a patch with a dot recording rate of R1 is subjected to colorimetry; and L2, a2, and b2 are respectively taken for color component quantities L, a, b obtained when a patch with a dot recording rate of R2 (R2>R1) is subjected to colorimetry. As difference in color component quantity between patches with recording rates of R1 and R2, $\Delta L = |L2-L1|$, $\Delta a = |a2-a1|$, and $\Delta b = |b2-b1|$ are computed. Thus, $\Delta L$, $\Delta a$, and $\Delta b$ take larger values as the difference in color component quantity between the patches with recording rates of R1 and R2 increases. Consequently, the color component quantity corresponding to the maximum computed value among $\Delta L$, $\Delta a$, and $\Delta b$ can be specified as the corresponding ink selected color component quantity. If of the varied dot recording rates, the minimum dot recording rate and the maximum dot recording rate are taken as recording rates R1 and R2, favorable color reproducibility is obtained in the target printer 20 with respect to reference color.

At S220, the first comparison printer is connected to the computer 10 so that the predetermined corresponding ink is discharged from the print head corresponding to the ink. The computer 10 is caused to carry out such control that the following is implemented: a plurality of corresponding ink first comparison patches P1 are printed in the predetermined kind of dot with the ink recording quantity corresponding to the image data for patches varied in a plurality of stages. That is, patches (standard images) P1 are printed with the first comparison printer under the same conditions as in S205.

At S225, similarly, the second comparison printer is connected to the computer 10 so that the predetermined corresponding ink is discharged from the print head corresponding to the ink. The computer 10 is caused to carry out such control that the following is implemented: a plurality of corresponding ink second comparison patches (standard images) P2 are printed in the predetermined kind of dot with the ink recording quantity corresponding to the image data for patches varied in a plurality of stages. The central part of FIG. 7 illustrates a case where patches in nine stages of dot recording rate between 10% and 90% inclusive in increments of 10% are printed in large dot 1 of the Y ink with the first comparison printer. The right part of the figure illustrates a case where patches are similarly printed with the second comparison printer.

At S230, the computer 10 subjects the corresponding ink first comparison patches P1 printed with the first comparison printer to colorimetry with the colorimeter 40. Then, it acquires the corresponding ink selected color component quantity specified at S215 from the result of the colorimetry with respect to each of the patches P1.

At S235, similarly, the computer subjects the corresponding ink second comparison patches P2 printed with the second comparison printer to colorimetry with the colorimeter 40. Then, it acquires the corresponding ink selected color component quantity from the result of the colorimetry with respect to each of the patches P2. That is, the computer 10 acquires the following by the processes of S205 to S235: the corresponding ink selected color component quantities related to a plurality of patches corresponding to a plurality of stages of ink recording quantity. The patches are printed in a common kind of dot of a common corresponding ink with the reference printer, first comparison printer, and second comparison printer.

At S240, the computer 10 acquires the following from among the corresponding ink selected color component quantities obtained from the print results of the reference printer, first comparison printer, and second comparison printer: the selected color component quantities corresponding to the standard ink recording quantity determined and stored beforehand. Description will be given with reference to FIG. 7. If the standard ink recording quantity (dot recording rate) is determined as 30%, the corresponding ink selected color component quantities corresponding to this standard ink recording quantity are as follows: $b_{03}$ as the result of colorimetry on the corresponding ink reference patches P0; $b_{13}$ as the result of colorimetry on the corresponding ink first comparison patches P1; and $b_{23}$ as the result of colorimetry on the corresponding ink second comparison patches P2. A technique for determining the standard ink recording quantity will be described later. Here, the color component quantity $b_{03}$ corresponds to reference colorimetry data cited in CLAIMS; and the color component quantities $b_{13}$ and $b_{23}$ correspond to comparison colorimetry data.

The process described in FIG. 3 is performed with respect to all the combinations of corresponding inks (print heads 29a to 29f corresponding to the respective corresponding inks) and dot kinds.

Subsequently, description will be given with reference to FIGS. 4 and 5.

At S245, the reference printer is connected to the computer 10. An ink cartridge filled with alternative ink, different from corresponding inks, is appropriately set in the cartridge holder so that the alternative ink is discharged from the print head. The computer 10 is caused to carry out such control that the following is implemented: a plurality of patches for alternative ink color component selection are printed on a printing medium in a predetermined kind of dot with the ink recording quantity varied in a plurality of stages. That is, patches for alternative ink color component selection in nine stages of dot recording rate between 10% and 90% inclusive in increments of 10% are printed with the reference printer as illustrated at the left part of FIG. 7, for example. These patches are printed based on predetermined image data for patches that represents a plurality of patches corresponding to a plurality of stages of dot recording rate. Each patch for alternative ink color component selection is a patch in alternative ink in solid color.

At S250, the patches printed at S245 are subjected to colorimetry with the colorimeter 40, and the computer 10 acquires the colorimetry data of each patch.

At S255, of a plurality of color component quantities L, a, and b constituting colorimetry data, the color component quantity that most drastically changes with change in dot recording rate is specified as the alternative ink selected color component quantity. This specification is made based on each piece of the colorimetry data obtained at S250 and the dot recording rate of each patch for alternative ink color component selection. In this embodiment, of the corresponding inks in C, M, Y, R, V, and K colors, the K ink is used as the alternative ink. Therefore, a printer is filled with the K ink in place of the C, M, Y, R, and V corresponding inks, excluding the K ink. Patches (standard images) are printed on a printing medium with a standard ink recording quantity with a printer in this state. The printed patches are subjected to colorimetry in the Lab color space to acquire alternative colorimetry data.

In an image only in the K ink, the color component quantity L drastically changes with change in ink recording quantity; however, the color component quantities a and b hardly change. Therefore, if the alternative ink is the K ink, the alternative ink selected color component quantity is the color component quantity L. Then, the data 14e2 representing the specified alternative ink selected color component is stored on the HD 14. The alternative ink need not be limited to one color, and such a constitution that it is not selected from among corresponding inks is possible.

At S260, the reference printer is brought into a state in which the alternative ink is discharged from each print head. The computer 10 is caused to carry out such control that the following is implemented: a plurality of patches P4 for reference color correction are printed based on standard dot quantity data that represents a plurality of patch images with a preset standard ink recording quantity.

Figure 9:
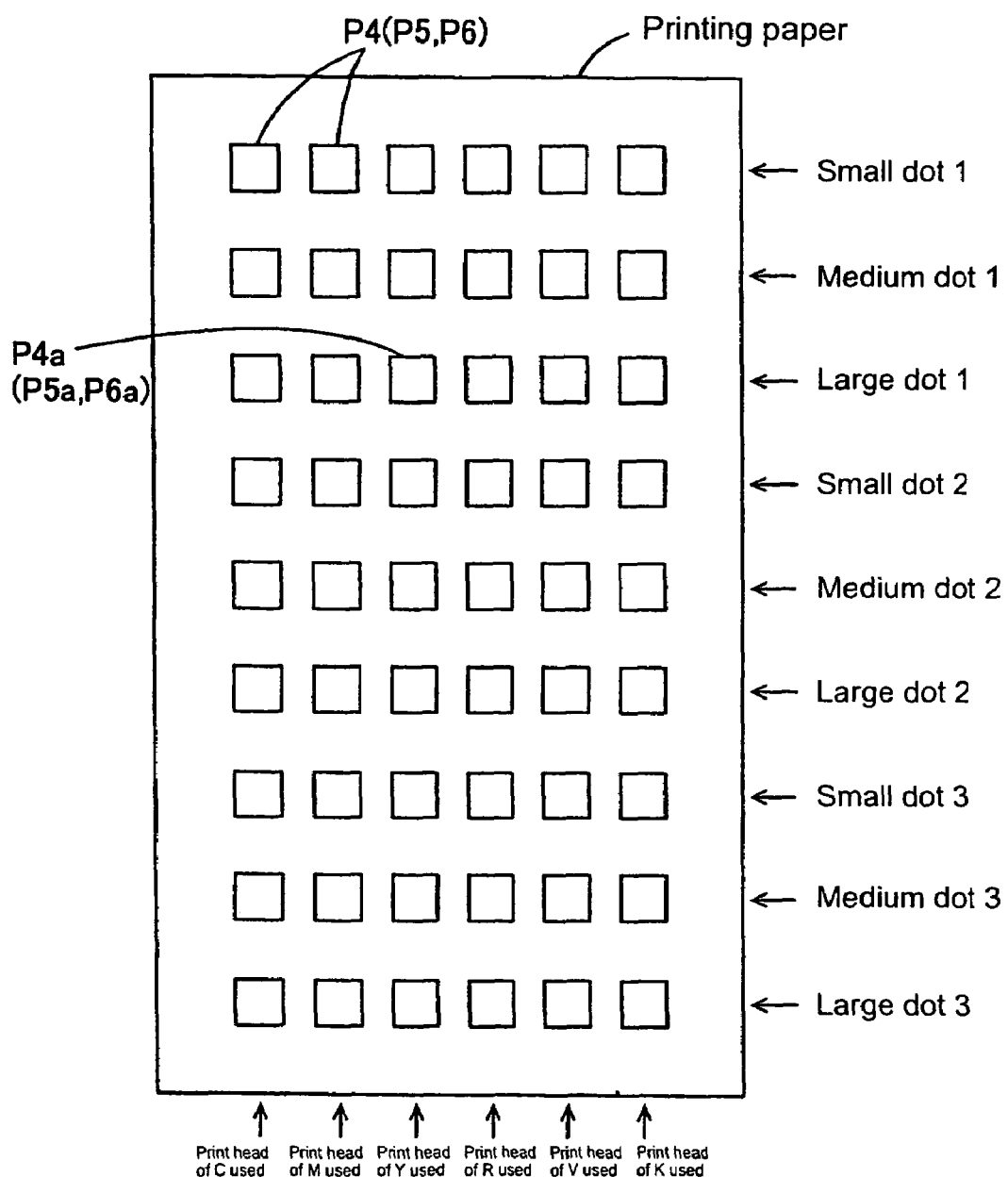
FIG. 9 is an explanatory drawing illustrating patches for reference color correction.

FIG. 9 illustrate a case where the patches P4 for reference color correction are printed on printing paper.

All of the patches P4 are in solid K color. They are respectively printed with a standard ink recording quantity under printing conditions associated with combinations of the print heads 29a to 29f corresponding to the respective corresponding inks C, M, Y, R, V, and K and kinds of dots. Description will be given with patch P4a in the figure taken as an example. This patch P4a is printed by discharging the K ink in large dot 1 from the print head 29c corresponding to the Y ink. The standard ink recording quantity with which each patch P4 is printed is determined by each printing condition (print head and dot kind). The standard ink recording quantity used when the corresponding ink selected color component quantities are acquired from the print results of the reference printer, first comparison printer, and second comparison printer at Step S240 is used for this purpose. Therefore, the dot recording rate of the patch P4a printed by discharging the K ink in large dot 1 from the print head 29c corresponding to the Y ink is 30%.

At S265, the patches P4 for reference color correction are subjected to colorimetry using the colorimeter 40. Further, the alternative ink selected color component quantities are acquired from the colorimetry data of each patch P4.

At S270, the first comparison printer is connected to the computer 10 so that the alternative ink is discharged from each print head. As in Step S260, the computer 10 is caused to carry out such control that a plurality of first comparison patches P5 for color correction are printed based on the standard dot quantity data. At S275, similarly, the second comparison printer is connected to the computer 10 so that the alternative ink is discharged from each print head. The computer 10 is caused to carry out such control that a plurality of second comparison patches P6 for color correction are printed based on the standard dot quantity data. Both the first comparison patches P5 for color correction and the second comparison patches P6 for color correction are in solid K color. They are printed with the standard ink recording quantity under printing conditions associated with combinations of the print heads 29a to 29f corresponding to the respective corresponding inks and the individual dot kinds. For this reason, FIG. 9 is also used in the description of the patches P5 and the patches P6 as appropriate.

At S280, the computer 10 subjects the first comparison patches P5 for color correction printed with the first comparison printer to colorimetry with the colorimeter 40. Further, the computer acquires the alternative ink selected color component quantity from the result of the colorimetry with respect to each of the patches P5.

At S285, similarly with S280, the computer subjects the second comparison patches P6 for color correction printed with the second comparison printer to colorimetry with the colorimeter 40. Further, the computer acquires the alternative ink selected color component quantity from the result of the colorimetry with respect to each of the patches P6. These alternative ink selected color component quantities with respect to each of the patches P5 and P6 correspond to comparison alternative colorimetry data cited in CLAIMS.

At S290, the alternative ink selected color component quantities obtained from the following are brought into correspondence with one another: the result of each colorimetry on the patches P4 for reference color correction, first comparison patches P5 for color correction, and second comparison patches P6 for color correction. This is done on the basis of printing conditions associated with combinations of the print heads 29a to 29f corresponding to the respective corresponding inks and the individual dot kinds.

Description will be given with patch P4a in FIG. 9 taken as an example. Operation is performed to bring the following into correspondence with one another: the alternative ink selected color component quantity $L_{43}$ of patch P4a; the alternative ink selected color component quantity $L_{53}$ of patch P5a printed with the first comparison printer under the same printing conditions as patch P4a; and the alternative ink selected color component quantity $L_{63}$ of patch P6a printed with the second comparison printer under the same printing conditions as patch P4a. The ink recording quantity (standard ink recording quantity) with which the three alternative ink selected color component quantities are printed is common as a matter of course. This operation of bringing alternative ink selected color component quantities into correspondence with one another is performed with respect to each of the following: the printing conditions associated with combinations of the print heads 29a to 29f corresponding to the respective corresponding inks and the individual dot kinds.

At S295, the computer 10 generates correspondence data 14f according to the correlation on the basis of the standard ink recording quantity. The correspondence data indicates the relation of conversion (reduction) between corresponding ink selected color component quantity and alternative ink selected color component quantity. The generated correspondence data 14f is stored on the HD 14.

The upper part of FIG. 10 shows an example of the correspondence data 14f. The example in this figure indicates the relation of conversion between the following: the corresponding ink selected color component quantities $b_{03}$, $b_{13}$, and $b_{23}$ associated with the standard ink recording quantity, acquired at S240; and the alternative ink selected color component quantities $L_{43}$, $L_{53}$, and $L_{63}$ associated with the standard ink recording quantity, acquired at Step S290. More specific description will be given. The corresponding ink selected color component quantity $b_{03}$ and the alternative ink selected color component quantity $L_{43}$ are respectively the results of colorimetry obtained by taking the following procedure: printing operation is performed with the same ink recording quantity (dot recording rate: 30%) and the same dot kind (large dot 1) with the same print head (29c) of the reference printer filled (supplied) with the corresponding ink (Y) and filled (supplied) with the alternative ink (K). Therefore, they form the relation of conversion of colorimetry data. Similarly, $b_{13}$ and $L_{53}$ obtained from the print result of the first comparison printer form the relation of conversion of colorimetry data; $b_{23}$ and $L_{63}$ obtained from the print result of the second comparison printer form the relation of conversion of colorimetry data. The correspondence data 14f is acquired with respect to each of printing conditions associated with combinations of the print heads 29a to 29f corresponding to the respective corresponding inks and the individual dot kinds. Then, it is stored in correspondence with each printing condition.

As mentioned above, the processes of up to S295 are carried out, and this meets the preconditions for acquiring color adjustment ID as error information in the target printer 20, described later. More specific description will be given. The computer 10 carries out the processes of up to S295 only one time, and generates and stores the correspondence data 14f and the like. Thereafter, it causes each target printer 20 as a mass-produced machine to print patches P7 for color correction, and acquires ID and carries out color compensation with respect to each target printer 20.

To acquire the correspondence data 14f, the following patches only has to be printed when corresponding ink first comparison patches P1 and corresponding ink second comparison patches P2 are respectively printed with the first comparison printer and the second comparison printer and subjected to colorimetry: patches corresponding to a predetermined standard ink recording quantity. It is unnecessary to print patches corresponding to a plurality of stages of ink recording quantity. In this embodiment, however, a plurality of corresponding ink reference patches P0, corresponding ink first comparison patches P1, and corresponding ink second comparison patches P2 are printed to acquire colorimetry data. Then, the color correction data 14b is generated based on such colorimetry data, as described later. In the above example, the first comparison printer and the second comparison printer are used when the correspondence data 14f or the color correction data 14b is generated. The number of comparison printers that are different from the reference printer in the quantity of ink stuck to a printing medium is arbitrary.

At S300, a printer 20 to be calibrated is connected to the computer 10 so that the alternative ink is discharged from each print head. The computer 10 is caused to carry out such control that a plurality of patches P7 for color correction are printed based on the standard dot quantity data. That is, similarly with the patches P4 (or P5 or P6) illustrated in FIG. 9, patches P7 in solid K color are printed with standard ink recording quantities corresponding to individual printing conditions under the printing conditions associated with combinations of the print heads 29a to 29f corresponding to the respective corresponding inks and the kinds of dots.

At S305, each patch P7 for color correction is subjected to colorimetry using the colorimeter 40. Further, the alternative ink selected color component quantity of each patch P7 for color correction is acquired from the obtained colorimetry values (alternative colorimetry data).

At S310, the following operation is performed based on the acquired alternative ink selected color component quantities of the patches P7 for color correction and the correspondence data 14f stored on the HD 14: the colorimetry data of the patches P7 for color correction printed in alternative ink is converted into colorimetry data (predictive colorimetry data) of the patches for color correction obtained when they are printed in corresponding ink under the same printing conditions. Thus, color adjustment ID is acquired.

The computer 10 correlates the alternative ink selected color component quantity of one patch P7 for color correction with each alternative ink selected color component quantity in the correspondence data 14f. The correspondence data 14f referred to at this time is correspondence data 14f associated with the same printing condition as the printing condition (print head and dot kind) of the patch P7 for color correction as the object of correlation.

Description will be given to a case where the following operation is performed: patch P7a printed in large dot 1 with the print head 29c for the corresponding ink Y filled with alternative ink is used as the patch P7 for color correction as the object of correlation; and the correspondence data 14f illustrated in FIG. 10 is referred to according thereto. As an example, it will be assumed that as the result of correlation, the alternative ink selected color component quantity of patch P7a agrees with alternative ink selected color component quantity $L_{53}$ in the correspondence data 14f. In this case, the corresponding ink selected color component quantity $b_{13}$ as the converted value of the alternative ink selected color component quantity $L_{53}$ becomes the converted value of the alternative ink selected color component quantity of the patch P7 for color correction. In this case, it turns out that the degree of color drift when large dot 1 is discharged from the print head 29c of the target printer 20 is the same as the degree of color drift in the first comparison printer under the same conditions.

Thus, the corresponding ink selected color component quantity is obtained as the result of conversion of the alternative ink selected color component quantity of the patch P7 for color correction. Then, the corresponding ink selected color component quantity is correlated with the corresponding ink selected color component quantity obtained from the print result of the reference printer placed in the correspondence data 14f. (In this case, the latter is corresponding ink selected color component quantity $b_{03}$). Thus, ID representing the result of correlation is determined.

Here, the ID can be computed, for example, by the equation ID=c·(SS−S0), where: SS is a converted color component quantity, or the corresponding ink selected color component quantity as the result of the conversion; S0 is a reference color component quantity, or the corresponding ink selected color component quantity obtained form the print result of the reference printer; and c is a predetermined coefficient (c>0).

In the above description, the alternative ink selected color component quantity of the patch P7 for color correction agrees with any alternative ink selected color component quantity placed in the correspondence data 14f. Needless to add, however, there are cases where such agreement does not take place. If there is no agreement, the following procedure is taken: each data placed in the correspondence data 14f is interpolated to convert an alternative ink selected color component quantity into an object ink selected color component quantity.

The middle part of FIG. 10 shows correspondence data 14f obtained when each data is interpolated. In the example in the figure, alternative ink selected color component quantities corresponding to the identical standard ink recording quantity are interpolated. This interpolation is carried out using a predetermined interpolating equation based on each alternative ink selected color component quantity obtained by actually carrying out colorimetry. This interpolation may be linear interpolation or interpolation using a predetermined higher-degree polynomial equation. Corresponding ink selected color component quantities corresponding to the identical standard ink recording quantity are interpolated. This interpolation is similarly carried out using a predetermined interpolating equation based on each corresponding ink selected color component quantity placed in the correspondence data 14f. As illustrated at the lower part of the figure, the correlation of conversion between each of the interpolated alternative ink selected color component quantities and each of the interpolated corresponding ink selected color component quantities is generated. As a result, the alternative ink selected color component quantities of the patches P7 for color correction can be uniquely converted into any corresponding ink selected color component quantity.

If each alternative ink selected color component quantity and each corresponding ink selected color component quantity are respectively interpolated, the amount of data in the correspondence data 14f before interpolation may be reduced than shown at the upper part of FIG. 10. For example, the correspondence data 14f generated at S295 may be constructed only of the following: each corresponding ink selected color component quantity and each alternative ink selected color component quantity respectively obtained from the print results of the first comparison printer and the second comparison printer. If the correspondence data 14f is constructed as mentioned above, the process in which patches P4 for reference color correction are printed in alternative ink with the reference printer and the patches P4 are subjected to colorimetry can be omitted. (This process corresponds to S260 and S265.) As a result, the process for acquiring error information is accelerated.

In this embodiment, the ID is computed with respect to each of the patches P7 for color correction, that is, with respect to each printing condition associated with combinations of the print heads 29a to 29f corresponding to the respective corresponding inks and the kinds of dots. At S315, the computer 10 records the computed ID in the memory 31 in the print head unit 29 of the target printer 20. As a result, the process of acquiring error information with respect to each combination of corresponding inks and dot kinds in the target printer 20 is completed.

When ID is acquired for compensating a color drift in a print head for the same corresponding ink as alternative ink, the ID is determined without carrying out the processes of S245 to S295. In this case, the corresponding ink selected color component quantities and the alternative ink selected color component quantities are identical with each other in color component. As a result, the correspondence data used at S310 is equal to each corresponding ink color component quantity acquired at S240.

The above-mentioned standard ink recording quantity can be determined as follows:

FIG. 11 illustrates a standard recording rate table T1. In this standard recording rate table T1, the standard ink recording quantity (dot recording rate) is lowered for the kinds of dots larger in ink quantity.

Figure 12:
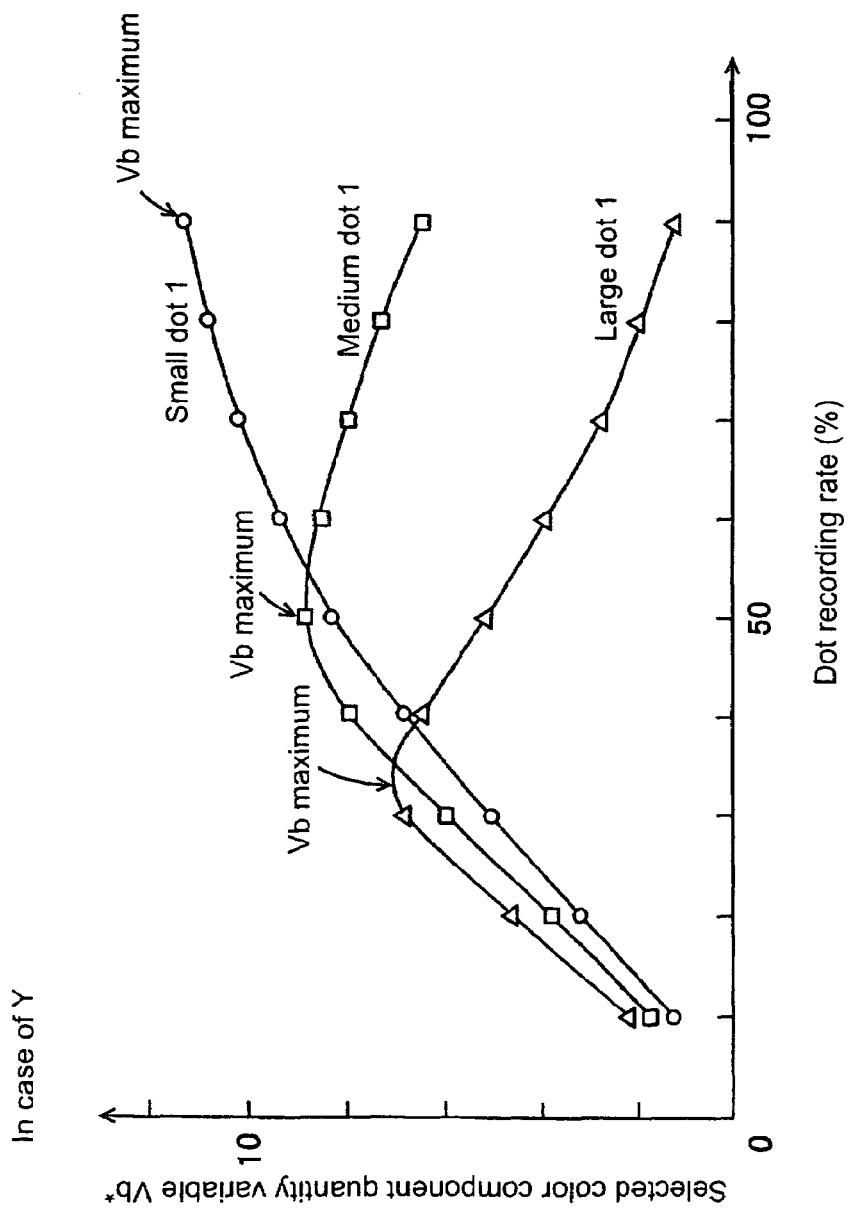
FIG. 12 is a drawing illustrating an example of selected color component variation versus dot recording rate by kind of dot.

FIG. 12 illustrates the amount of variation in colorimetry data due to variation in the quantity of ink stuck to a printing medium on an ink kind-by-ink kind basis. This figure shows an example of results obtained by the following procedure with respect to large dot 1, medium dot 1, and small dot 1 of Y: corresponding ink first comparison patches P1 and corresponding ink second comparison patches P2 in nine stages of dot recording rate between 10% and 90% inclusive are printed on glazed paper; the printed patches are subjected to colorimetry in the Lab color space; and the amount of variation in corresponding ink selected color component quantity (b-quantity) is determined with respect to each dot recording rate. The horizontal axis represents dot recording rate (unit: %), and the vertical axis represents the amount of variation in b-quantity (Vb). As is apparent from FIG. 12, in general, the dot recording rate at which the amount of variation Vb in corresponding ink selected color component quantity is maximized with respect to a dot recording rate for some color is lowered in dot kinds larger in ink quantity.

Therefore, the computer 10 stores the standard recording rate table T1 on the HD 14 beforehand, and generates the standard dot quantity data by referring to the table T1. When patches P4 for reference color correction, first comparison patches P5 for color correction, second comparison patches P6 for color correction, or patches P7 for color correction are printed, the computer takes the following measure: the dot recording rate of patches printed is lowered with increase in the ink quantity of dot; and each printer is caused to print patches with the standard ink recording quantity on a dot kind-by-dot kind basis. The standard ink recording quantity determined according to the table T1 becomes the common ink recording quantity associated with the corresponding ink and alternative ink selected color component quantities constituting the correspondence data 14f. The standard recording rate table T1 is provided for each color and each set mode (set mode for dot size). FIG. 11 illustrates an example of set mode 1 (mode in which large dot 1, medium dot 1, and small dot 1 can be discharged) of Y.

When the standard ink recording quantity is acquired, the standard recording rate table T1 is not always used. The computer 10 may actually acquire the ink recording quantity largest in the amount of variation Vb with respect to each combination of the corresponding inks and the kinds of dots based on the following: the corresponding ink selected color component quantities of a plurality of corresponding ink first comparison patches P1 acquired at S230; and the corresponding ink selected color component quantities of a plurality of corresponding ink second comparison patches P2 acquired at S235. Each of the determined ink recording quantities may be taken as the standard ink recording quantity for each combination of the corresponding inks (print heads corresponding to the corresponding inks) and the kinds of dots.

Figure 13:
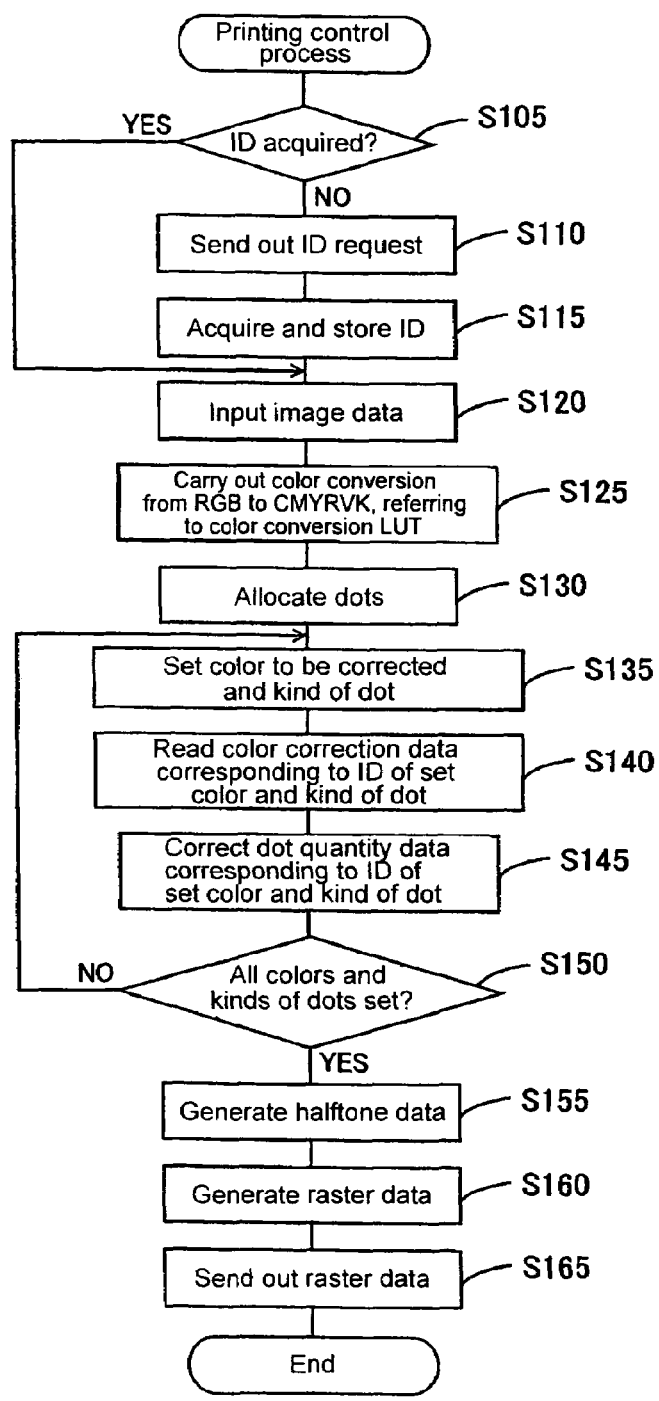
FIG. 13 is a flowchart illustrating printing control process.
Figure 14:
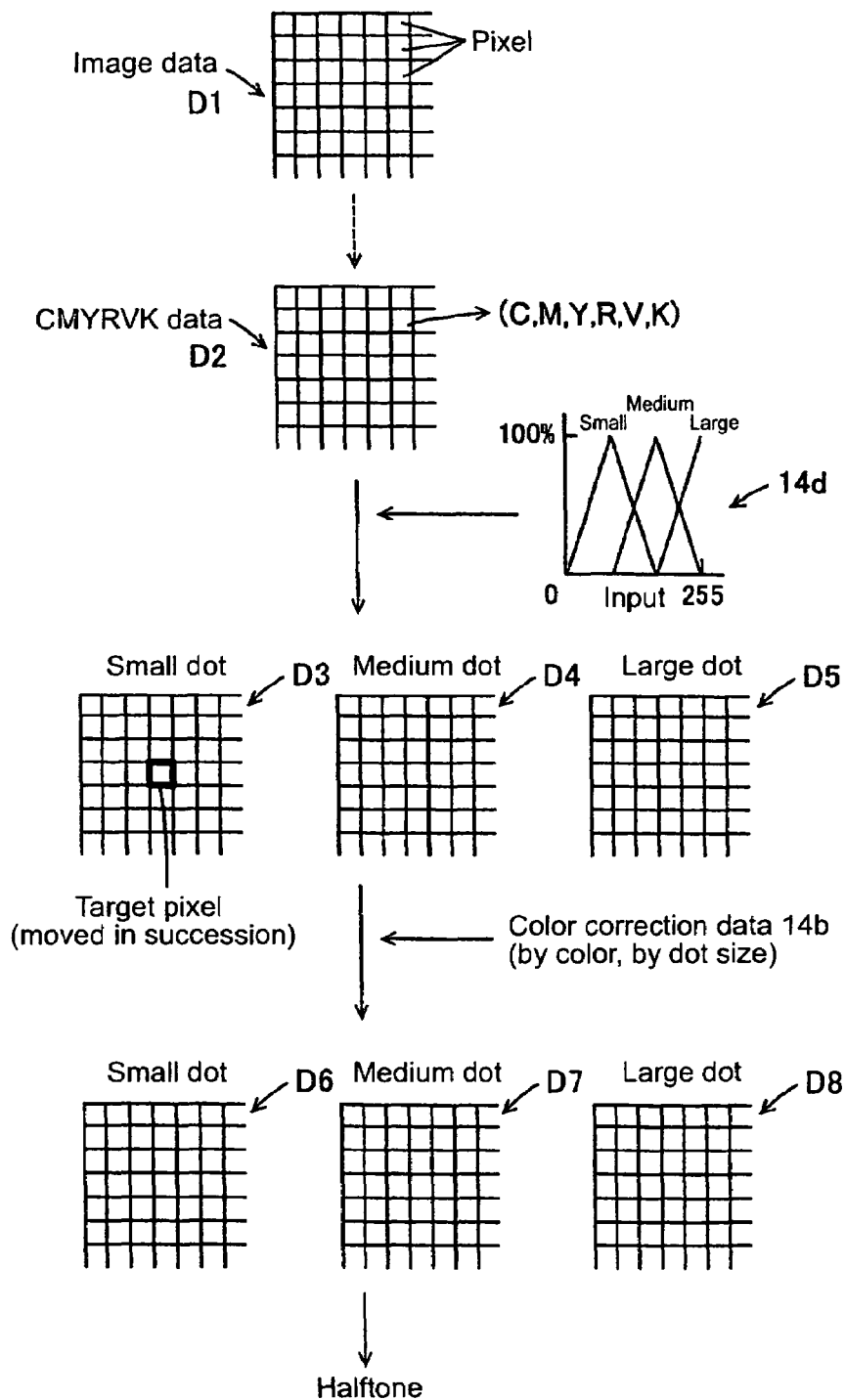
FIG. 14 is a drawing schematically illustrating printing control process.
Figure 15:
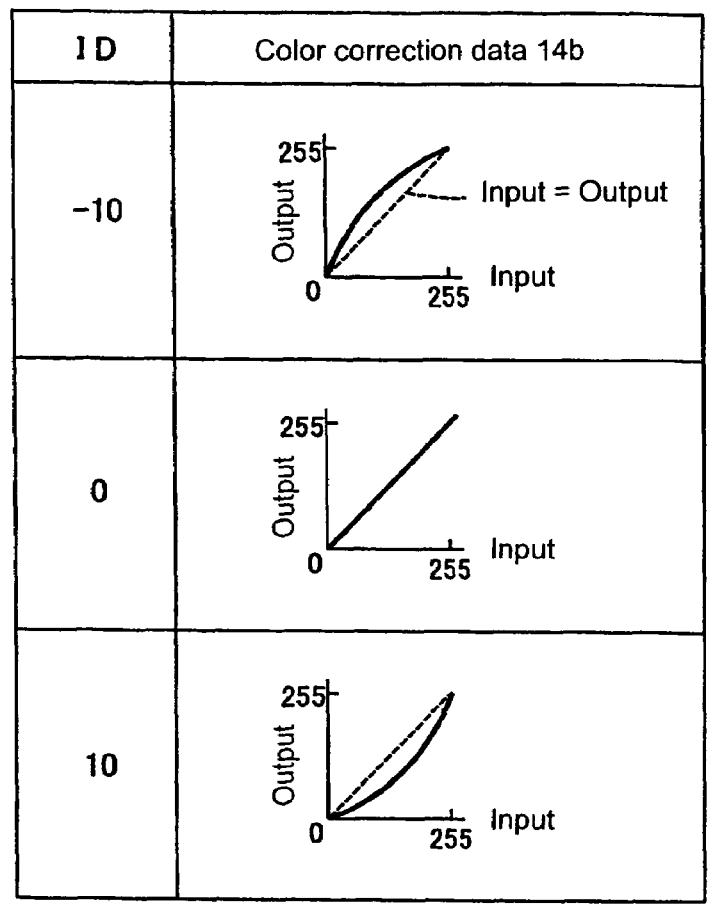
FIG. 15 is a drawing schematically illustrating the structure of color correction data.

(3) Description of Printing Control Process:

FIG. 13 is a flowchart illustrating a process in which printing data is corrected using ID, and printing control is carried out based on the corrected printing data. FIG. 14 is a drawing schematically illustrating this process. FIG. 15 is a drawing schematically illustrating the structures of a plurality of pieces of color correction data 14b stored on the HD (recording area) 14. In the following description, the print heads 29a to 29f of a target printer 20 to be subjected to printing control are filled with the respective corresponding inks.

First, the computer 10 determines whether ID has been already acquired from the target printer 20 or not (S105). If affirmative judgment is made, the computer determines that ID need not be acquired from the target printer 20, and the operation proceeds to S120.

If negative judgment is made, the computer creates a request for a color adjustment ID, and transmits it to the target printer 20 (S110). When the target printer 20 receives this request, it reads 54 different IDs for all the combinations of all the six kinds of corresponding ink and all the nine kinds of dots from the memory 31 in the print head unit 29, and transmits them to the computer 10. The computer 10 acquires all the IDs and stores them on the HD 14 as ID 14a (S115). As mentioned above, the IDs are integrated with the target printer 20. Therefore, the user need not separately input IDs corresponding to a printer even if he/she changes the printer, and this is convenient.

At S120, the computer 10 inputs image data D1 comprising gradation data corresponding to a plurality of element colors on a pixel-by-pixel basis from a predetermined image input device, the HD 14, or the like. The computer converts it into RGB data in the wide RGB color space in which an image is represented by a plurality of pixels with a gradation with respect to each of R, G, and B. At this time, data may be partly read, or only a pointer that represents a buffer area used for passing data may be passed. The inputted image data D1 is data that represents an image by a large number of pixels in a dot matrix pattern with a gradation. Such data includes image data composed of R, G, and B defined in the sRGB color space, image data composed of Y, U, and V in the YUV color system, and the like. Needless to add, the inputted image data may be the following data: data in compliance with the Exif2.2 standard (Exif is a registered trademark of Japan Electronics and Information Technology Industries Association); data supporting Print Image Matching (PIM: PIM is a registered trademark of Seiko Epson Corporation); or the like. The components of the image data have various numbers of gradations. Therefore, the image data is converted into RGB data in the wide RGB color space with R, G, and B at 256 levels of gray according to the definition of the sRGB, YUV color system, or the like. The RGB data is printing data in which an image is represented by a plurality of element colors R, G, and B.

Next, the computer 10 moves the target pixel in succession, taking the gradation data of each pixel constituting the RGB data as the object of conversion. While doing this, the computer refers to color conversion LUTs, and color converts the RGB data into CMYRVK data comprising gradation data corresponding to the quantity consumed of each of the C, M, Y, R, V, and K inks (S125). The color conversion LUT is an information table that defines the correspondence between the RGB data and CMYRVK data in which an image is represented by the same numbers of pixels in C, M, Y, R, V, and K with a gradation with respect to a plurality of reference points. If CMYRVK data matched with the inputted RGB data is not placed in color conversion LUTs, the following procedure is taken: CMYRVK data corresponding to a plurality of pieces of RGB data close to the inputted RGB data is acquired; and it is converted into CMYRVK data corresponding to the RGB data by interpolation, such as volumetric interpolation. The CMYRVK data D2 is printing data in an image is represented by a large number (predetermined number) of pixels in a dot matrix pattern with a gradation, as RGB data. The gradation data of each pixel is data with each of C, M, Y, R, V, and K at 256 levels of gray, which data represents the quantity consumed of each corresponding ink discharged from a print head by the printer 20.

Thereafter, the computer moves the target pixel in succession, taking the gradation data of each pixel constituting the CMYRVK data D2 as the object of conversion. While doing this, the computer refers to a dot allocation table 14d, and carries out dot allocation process. In the dot allocation process, the computer converts the gradation data (input gradation data) constituting the CMYRVK data D2 with respect to each of the C, M, Y, R, V, and K colors into dot quantity data. The dot quantity data represents the amount of formed dots of a plurality of kinds, different in ink quantity, on a kind-by-kind basis (output gradation data) (S130). In this embodiment, a color drift is compensated by using the ID 14a to correct dot quantity data (printing data).

As shown at the upper part of FIG. 16, the dot allocation table 14d is an information table that defines the correspondence between the following: input gradation data that represents the quantities consumed of corresponding inks used in a target printer 20; and output gradation data that represents the amount of dot formed with respect to each of the kinds of dots. The table 14d is provided for each color, and it holds output gradation values that represent the amount of dot formed with each input gradation value, on a dot kind-by-kind basis. FIG. 14 schematically illustrates the dot quantity data of each dot, large, medium, and small, versus the input gradation values. In the figure, the horizontal axis represents input gradation values, and the vertical axis represents the relative values of output gradation values. In this embodiment, three different types of set modes for dot size are provided. Consequently, the dot allocation table 14d holds the following data in correspondence with set modes 1 to 3: output gradation data D11 referred to when small dot 1, medium dot 1, or large dot 1 is formed; output gradation data D12 referred to when small dot 2, medium dot 2, or large dot 2 is formed; and output gradation data D13 referred to when small dot 3, medium dot 3, or large dot 3 is formed.

In dot allocating process, the dot allocation table 14d is referred to, and gradation data constituting the CMYRVK data D2 is allocated to the amounts of usage of dots of a plurality of kinds corresponding to any of set modes 1 to 3. Thus, as illustrated in FIG. 14, dot quantity data D3 for small dots, dot quantity data D4 for medium dots, and dot quantity data D5 for large dots are generated. Like CMYRVK data D2, these dot quantity data D3 to D5 are data in which an image is represented by a large number of pixels in a dot matrix pattern with a gradation. The gradation data of each pixel is data with each of C, M, Y, R, V and K at 256 levels of gray, which data represents the quantity of ink consumed of each dot discharged from a print head by the target printer 20.

However, even if the target printer 20 is caused to perform printing operation using dot quantity data at this stage, a subtle error can be produced in the colors of an image printed on a printing medium. This is because of the following: a difference in the weight of ink discharged from each print nozzle train; there is slight variation in voltage applied to print heads when the print heads are assembled to a printer; and the like. Dots formed on a printing medium may not become substantially circular, for example, they may be divided depending on this variation in voltage or the state of assembly of print heads. As a result, slight variation can be produced in the colors of a printed image. Consequently, dot quantity data is corrected so that such variation in colors is compensated.

After the computer 10 generates each dot quantity data, it sets an ink color whose dot quantity data is to be corrected and a dot kind (S135). An ink color to be corrected and a dot kind can be set from among 54 variations in total, for example, by taking the following measures: a different numeric value is correlated with each of 54 variations of all the inks and all the dots, and the value of a pointer for storing the numeric values is updated in succession.

Description will be given to the color correction data 14b for correcting dot quantity data.

As illustrated in FIG. 15, each color correction data 14b is stored on the HD 14 in correspondence with a value of a predetermined ID. As also illustrated at the lower part of the figure, the color correction data 14b is an information table that defines the correspondence between the following with respect to each gradation (all the gradations) of input gradation value Ai: input gradation value Ai (i is an integer between 0 and 255 inclusive) and output gradation value. The output gradation value ACi versus the input gradation value Ai is defined as indicated by solid line at the upper part of the figure. Each color correction data 14b illustrated in the figure as an example is data for correcting dot quantity data that represents the quantity of the Y ink consumed when the Y ink is outputted in large dot 1.

ID=10 in the figure is equivalent to a value computed when the following procedure is taken with respect to the correspondence data 14f illustrated in FIG. 10: corresponding ink selected color component quantities obtained from the print result of the first comparison printer are correlated with corresponding ink selected color component quantities obtained from the print result of the reference printer. Therefore, the color correction data 14b stored in correspondence with ID=10 corresponds to the following data: data for correcting dot quantity data in the first comparison printer so that the colorimetry data of an image printed with the first comparison printer by discharging the Y ink in large dot 1 substantially agrees with the colorimetry data of an image printed with the reference printer by discharging the Y ink in large dot 1. In other words, the color correction data 14b of ID=10 is data for correcting dot quantity data so that the following is implemented: the colorimetry data of a printed image from the first comparison printer most favorably agrees with the colorimetry data of a printed image from the reference printer. Similarly, ID=−10 is equivalent to a value computed when the following procedure is taken with respect to the correspondence data 14f: corresponding ink selected color component quantities obtained from the print result of the second comparison printer are correlated with corresponding ink selected color component quantities obtained from the print result of the reference printer. Therefore, the color correction data 14b stored in correspondence with ID=−10 corresponds to the following data: data for correcting dot quantity data in the second comparison printer so that the colorimetry data of an image printed with the second comparison printer by discharging the Y ink in large dot 1 substantially agrees with the colorimetry data of an image printed with the reference printer by discharging the Y ink in large dot 1. In other words, the color correction data 14b of ID=−10 is data for correcting dot quantity data so that the following is implemented: the colorimetry data of a printed image from the second comparison printer most favorably agrees with the colorimetry data of a printed image from the reference printer.

The color correction data 14b can be obtained as follows:

In this embodiment, as mentioned above, each colorimetry data is obtained by printing the following patches with the individual printers with respect to each printing condition of combinations of the corresponding inks and the kinds of dots: a plurality of corresponding ink reference patches P0 are printed with the reference printer with the ink recording quantity varied in a plurality of stages; a plurality of corresponding ink first comparison patches P1 are printed with the first comparison printer with the ink recording quantity varied in a plurality of stages; and a plurality of corresponding ink second comparison patches P2 are printed with the second comparison printer with the ink recording quantity varied in a plurality of stages. Therefore, the color correction data 14b can be acquired from the correspondence between each colorimetry data in the three printers and each ink recording quantity. Here, dot quantity data that represents patches with some ink recording quantity (dot recording rate Ri) is data in which an image is represented by a plurality of pixels with a gradation. To represent the dot quantity data with gradation data of 0 to MAXGR (maximum gradation value: 256 levels of gray in this embodiment), the gradation value of each pixel can be set to Ri×MAXGR.

Consequently, as correction data 14b corresponding to ID=10, such color correction correspondence that the following is implemented can be generated: the colorimetry data (corresponding ink selected color component quantity) of each patch P0 is correlated with that of each patch P1; when some dot quantity data is taken as an input gradation value, dot quantity data for printing patches P1 that obtain colorimetry data of substantially the same value as the colorimetry data corresponding to the input gradation value of the colorimetry data of the patches P0 is taken as a corrected output gradation value.

Colorimetry data associated with dot quantity data other than the dot quantity data with which the patches P0 and P1 are printed can be obtained as appropriate by interpolation referring to preceding colorimetry data and subsequent colorimetry data. Needless to add, when the patches P0, P1, and P2 are printed, they may be printed with dot recording rates corresponding to all the gradation values of 0 to 255.

Similarly, as correction data 14b corresponding to ID=−10, such color correction correspondence that the following is implemented can be generated: the colorimetry data (corresponding ink selected color component quantity) of each patch P0 is correlated with that of each patch P2; when some dot quantity data is taken as an input gradation value, dot quantity data associated with patches P2 that obtain colorimetry data of substantially the same value as the colorimetry data corresponding to the input gradation value of the colorimetry data of the patches P0 is taken as a corrected output gradation value. Each color correction data 14b in correspondence with such ID is obtained beforehand with respect to each printing condition of the corresponding inks and the kinds of dots.

With the color correction data 14b recorded on the HD 14 beforehand, the ID 14a for the ink color and dot kind set at S135 is read from the HD 14. The color correction data 14b corresponding to the value of the ID 14a is specified from among a plurality of pieces of color correction data 14b corresponding to the set ink color and dot kind stored on the HD 14. Then, this color correction data 14b is read out (S140).

More specific description will be given. If ID 14a for the set ink color and dot kind agrees with any of IDs for the color correction data 14b stored beforehand in correspondence with the set ink color and dot kind, the color correction data 14b corresponding to the matched ID is read out. (In the description with respect to FIG. 15, the above-mentioned ID is ID=10 or −10.) If color correction data 14b corresponding to all the IDs 14a that can take various values depending on the characteristics of color drift in target printers 20 is stored in the computer 10 beforehand, a problem arises. The quantity of work is enormous, and much memory resource is required. Consequently, if the ID 14a for the set ink color and dot color does not agree with any ID for the color correction data 14b stored beforehand, the following procedure is taken: the color correction data 14b is corrected according to the value of the ID 14a, and the corrected color correction data is read out. For example, of the color correction data 14b stored beforehand, color correction data 14b corresponding to ID whose value is close to that of the ID 14a is selected. Further, a coefficient corresponding to the difference between the ID 14a and ID=0 is uniformly multiplied with each output gradation value in the selected color correction data 14b. Thus, corrected color correction data is acquired.

The target pixel is moved in succession with the gradation data of each pixel constituting the dot quantity data corresponding to the set ink color and dot kind taken as the object of conversion. While this is being done, the color correction data 14b read out at S140 is referred to, and the dot quantity data of the target pixel is thereby corrected. Thus, corrected dot quantity data D6 to D8 are generated (S145).

If the ID 14a takes a negative value, the target printer 20 is lower in the degree of color development on a printing medium than the reference printer. As illustrated in FIG. 15, therefore, the color correction data 14b is so constructed that output gradation values are higher than input gradation values in overall tendency so as to enhance the degree of color development in printed images. Therefore, the gradation value of dot quantity data of such an ink color and dot kind that the ID 14a takes a negative value is corrected to a higher value in overall tendency by referring to such color correction data 14b. If the ID 14a takes a positive value, the target printer 20 is higher in the degree of color development on a printing medium than the reference printer. As illustrated in the figure, therefore, the color correction data is so constructed that output gradation values are lower than input gradation values in overall tendency so as to lower the degree of color development in printed images. Therefore, the gradation value of dot quantity data of such an ink color and dot kind that the ID 14a takes a positive value is corrected to a lower value in overall tendency by referring to such color correction data. Thus, the target printer 20 with which the patches P7 for color correction were printed can be color compensated.

Thereafter, it is determined whether setting has been made with respect to all the combinations of the ink colors and the kinds of dots (S150). If negative judgment is made, the processes of S135 to S150 are repeated; if affirmative judgment is made, the operation proceeds to S155.

At S155, the computer 10 carries out a predetermined halftone process, such as error diffusion method, dither method, or density pattern method, on dot quantity data on a dot size-by-dot size basis. It thereby generates halftone data identical in number of pixels with the CMYRVK data with respect to each of C, M, Y, R, V, and K. The halftone data is data that represents the state of dot formation as the presence of absence of formed dots. For example, gradation values can be binarized with gradation value "1" brought into correspondence with the presence of a formed dot, and gradation value "0" brought into correspondence with the absence of a formed dot. Thus, binary data of two levels of gray can be obtained. Needless to add, the data may be constructed as data of four levels of gray or the like.

The computer 10 carries out a predetermined rasterizing process on the generated halftone data to arrange the data in the order of use in a printer and generates raster data with respect to each of C, M, Y, R, V, and K (S160). Then, it outputs the raster data to the target printer 20 (S165), and terminates the flow of the processing. The target printer 20 acquires the raster data that represents an image, and drives its print heads to discharge inks based on these data. The inks are stuck to printing paper, and a printed image corresponding to the RGB data is formed. The raster data is data with color drift compensated with respect to each of C, M, Y, R, V, and K and with respect to each kind of dot. Therefore, the printed image is an image with color drift compensated.

Printing data to be corrected during color compensation may be halftone data, raster data, or the like, not the dot quantity data. In case of these data, a printed image can be color compensated by increasing or decreasing the number of dots formed on a printing medium at a rate corresponding to the value of ID. If only one kind of dot size is used, CMYRVK data D2 immediately after color conversion can be taken as printing data to be corrected. In case of the CMYRVK data D2, a printed image can be color compensated by referring to color correction data corresponding to the value of ID, like correction on the dot quantity data. Needles to add, a printed image can be color compensated with RGB data before color conversion by taking the following measure: color correction LUTs that define the correspondence between RGB data before correction and RGB data after correction are prepared in correspondence with the values of ID, and RGB data is corrected by referring to a color correction LUT corresponding to the value of ID.

If only one kind of dot size is used, the following may be taken as ink recording quantity in place of dot recording rate: ink recording density, which is the weight of ink stuck to a printing medium per unit area; the ratio of the weight of ink stuck to a predetermined area on a printing medium to the weight of ink when ink dots are formed in all the pixels in the same area on a printing medium, or ink recording rate.

According to the present invention, as mentioned above, a color adjustment ID can be acquired for each combination of the print heads $29a$ to $29f$ and the kinds of dots without printing patch images with target printers 20 with their print heads $29a$ to $29f$ filled with the respective corresponding inks. This is done by printing color correction patches P7 in alternative ink to obtain colorimetry data. Color drift can be compensated with respect to each of combinations of the corresponding inks and the kinds of dots by utilizing these IDs. Therefore, the cost required for calibration can be reduced by using one of all the color corresponding inks as the alternative ink, by using more inexpensive ink as the alternative ink when some corresponding ink is expensive, or by taking the like measures. It is unnecessary to prepare corresponding inks in quantities required to fill the print heads $29a$ to $29f$ of each printer 20 to be calibrated. Therefore, the efficiency of calibration is enhanced.

A target printer 20 is color compensated based on the following: values obtained by converting the colorimetry data of patches P7 for color correction actually printed on a printing medium in alternative ink with the target printer into the colorimetry data of corresponding inks; and color adjustment IDs that represent the result of correlation with the colorimetry data of corresponding ink as the reference. Therefore, a subtle error in the colors of a printed image due to slight variation in the voltage applied to print heads is not produced. As a result, the color reproducibility of a printed image with respect to reference color become more favorable than in conventional cases where only the compensation of the weight of ink is carried out.

In this embodiment, the following operation is performed using a first comparison printer and a second comparison printer that are different in the quantity of ink stuck to a printing medium from a reference printer: their predetermined print heads are actually filled with corresponding ink to print patch images; further, the predetermined print heads are filled with alternative ink to print patch images. Then, correspondence data $14f$ in which the colorimetry data of patches in corresponding ink and the colorimetry data of patches in alternative ink are brought into correspondence with each other on the basis of the same standard ink recording quantity is generated. For this reason, the former colorimetry data described below can be easily and reliably converted into the latter colorimetry data described below by directly utilizing the correspondence data $14f$ or interpolating the correlation of conversion in the data $14f$: the colorimetry data of patch images printed with the standard ink recording quantity in alternative ink with a target printer 20 expected to differ in the quantity of ink stuck to a printing medium to some degree from a reference printer; and the colorimetry data obtained from patch images printed with the standard ink recording quantity in corresponding ink with the target printer 20. As a result, IDs that represent the result of correlation with the colorimetry data of corresponding ink as the reference also reflect the degree of color drift in the target printer 20, and printing data can be corrected with accuracy.

Printing data is corrected according to the value of ID that represents only the result of correlation of the selected color component quantity that most drastically changes with change in ink recording quantity, of the color component quantities constituting colorimetry data. Therefore, printing data is color corrected with accuracy. At the same time, the ID is computed using the result of correlation of only the selected color component quantity that most drastically changes with change in ink recording quantity. Therefore, complicated computation is unnecessary to determine ID. As a result, the entire calibrating operation can be accelerated.

The ID represents the result of correlation between the following with respect to each printing condition including print heads used and the kinds of dots: the corresponding ink selected color component quantities of patch images printed with an ink recording quantity with which fluctuation in corresponding ink selected color component quantity due to variation in the quantity of ink stuck to a printing medium is great or maximized; and the corresponding ink selected color component quantities of patch images printed with the same ink recording quantity with a reference printer. Therefore, it accurately reflects the degree of color drift in a target printer 20 under each printing condition. As a result, the color reproducibility of a printed image can be more reliability ensured with respect to reference color by color compensation using the ID. Calibrating operation can be more quickly performed by generating IDs using the selected color component quantities of only patches with an ink recording quantity with which the fluctuation is great or maximized.

Figure 17:
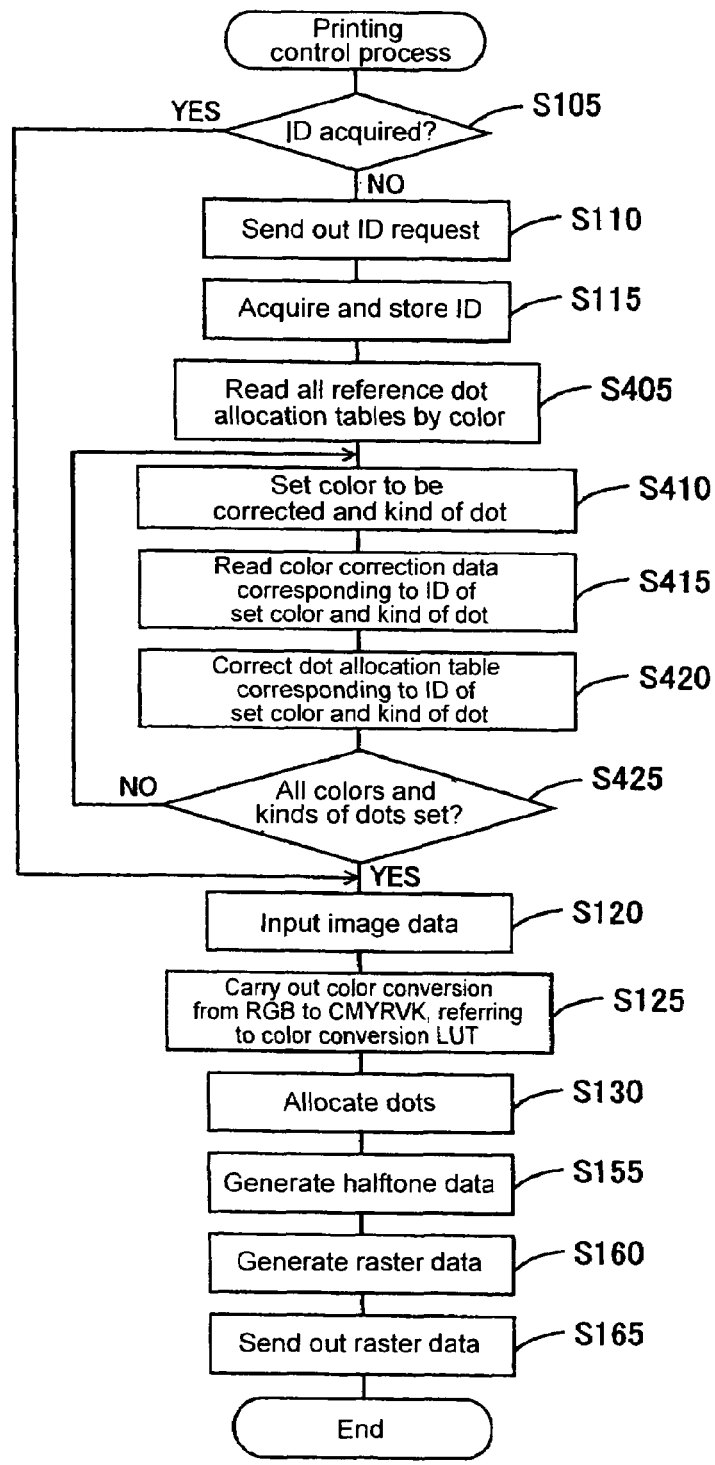
FIG. 17 is a flowchart illustrating printing control process in a modification.

(4) Modifications:

When dot quantity data is corrected, as illustrated in FIG. 17, the dot allocation table $14d$ itself may be corrected, and the dot quantity data may be corrected by referring to the corrected table. The processes of S105 to S130 and S155 to S165 are substantially the same as those illustrated in FIG. 13. In the flow illustrated in this figure, the ID is stored on the HD 14 at S115, and then the operation proceeds to S405.

At S405, all the dot allocation tables $14d$ provided for individual colors are read from the HD 14. Then, an ink color and a dot kind whose data in the tables $14d$ is to be corrected are set (S410). The ID $14a$ for the set ink color and dot kind is read from the HD 14. Then, the color correction data $14b$ corresponding to that ID $14a$ is read from among a plurality of pieces of color correction data $14b$ corresponding to the set ink color and dot kind, stored on the HD 14 (S415). The data in the table $14d$ corresponding to the set ink color and dot kind is corrected by referring to the color correction data $14b$ read out (S420).

As illustrated in FIG. 16, the dot allocation tables before and after correction are so constructed that the following can be implemented: the CMYRVK data can be converted into dot quantity data with respect to each color and each dot kind by referring to the output gradation value corresponding to the dot kind based on an address corresponding to the value of each gradation data constituting the CMYRVK data. When the dot allocation table 14*d* as the reference before correction is created, the output gradation value of the table 14*d* is replaced with the output gradation value of the color correction data 14*b*. The dot allocation table after correction can be thereby generated. As an example, it will be assumed that the output gradation value of small dot 1 of C in the table 14*d* as the reference is Ai, and the output gradation value corresponding to the input gradation value Ai in the color correction table 14*b* is ACi. In this case, the output gradation value Ai of small dot 1 of C is corrected by replacing Ai with ACi with respect to the output gradation value of the table 14*d*.

After the corrected dot allocation table is generated, it is determined whether setting has been made for all the combinations of ink colors and dot kinds (S425). If negative judgment is made, the processes of S410 to S425 are repeated. If affirmative judgment is made, the operation proceeds to S120, and image data is inputted and color conversion is carried out. Then, dot quantity data is generated referring to the corrected dot allocation table (S120 to S130) Thus, an image color compensated using the dot quantity data can be printed with the printer (S155 to S165).

As mentioned above, the following advantages are brought by correcting and storing a dot allocation table once: the process of correcting printing data can be accelerated, and the processing speed of printing control on a printer can be enhanced.

The foregoing invention has been described in terms of preferred embodiments. However, those skilled, in the art will recognize that many variations of such embodiments exist. Such variations are intended to be within the scope of the present invention and the appended claims.

What is claimed is:

1. A printing control device that carries out printing control on a printing device so designed that a print head is filled with a corresponding ink corresponding thereto and the corresponding ink is stuck to a printing medium by the print head to form an image corresponding to printing data, comprising:
    an alternative colorimetry data acquisition unit that acquires alternative colorimetry data obtained by subjecting a printed standard image to colorimetry in a predetermined color space, the standard image being printed on a printing medium with a standard ink recording quantity with the printing device filled with alternative ink different from the corresponding ink;
    an error information acquisition unit that converts the acquired alternative colorimetry data into predictive colorimetry data obtained when a standard image is printed on a printing medium with the standard ink recording quantity with the printing device filled with the corresponding ink and the printed standard image is subjected to colorimetry in a predetermined color space, and thereby acquires error information that represents the result of correlation between predictive colorimetry data acquired by the conversion and predetermined reference colorimetry data;
    a color correction data determination unit that determines color correction data for compensating a color drift of the corresponding ink in the printing device according to the value of the error information; and
    a printing control unit that, using the color correction data, corrects printing data that represents an image into printing data for compensating a color drift of an image printed with the printing device, and controls the printing device to print an image corresponding to the corrected printing data,
    wherein a predetermined reference printing device and one or more comparison printing devices that develops variation in the quantity of ink stuck to a printing medium as compared with the reference printing device are filled with the corresponding inks, images are printed on printing media with a predetermined ink recording quantity with the reference printing device and the comparison printing devices and subjected to colorimetry in the predetermined color space to obtain colorimetry data, color correction data for compensating a color drift in the colorimetry data of the image printed with the comparison printing devices with respect to the colorimetry data of the reference printing devices is generated, and a storage area in which the generated color correction data is stored in correspondence with predetermined error information is provided, and
    wherein, if the error information acquired by the error information acciuisition unit agrees with the predetermined error information, the color correction data determination unit takes the stored color correction data as color correction data for compensating a color drift of the corresponding inks, and, if the acquired error information does not agree with the predetermined error information, the color correction data determination unit takes corrected color correction data obtained by correcting the stored color correction data according to the value of the acquired error information as color correction data for compensating a color drift of the corresponding inks 2. The printing control device according to claim 1 wherein,
    the corresponding ink is one of a cyan ink, a magenta ink, a yellow ink, a red ink and a violet ink,
    the alternative ink is a black ink,
    the alternative colorimetry data is a colorimetry data obtained by subjecting a standard image to colorimetry in L*a*b* color space, the standard image being printed on a printing medium with a standard ink recording quantity with the printing device filled with the black ink, and
    the predictive colorimetry data is a colorimetry data obtained when a standard image is printed on a printing medium with the standard ink recording quantity with the printing device filled with one of the cyan ink, the magenta ink, the yellow ink, the red ink and the violet ink and is subjected to colorimetry in L*a*b* color space.

3. A printing control method for carrying out printing control on a printing device so designed that a print head is filled with a corresponding ink corresponding thereto, and the corresponding ink is stuck to a printing medium by the print head to form an image corresponding to printing data, the method comprising:
    filling a predetermined reference printing device and one or more comparison printing devices that develops variation in the quantity of ink stuck to a printing medium as compared with the reference printing device with the corresponding inks;
    printing images on printing media with a predetermined ink recording quantity with the reference printing device and the comparison printing devices;
    subjecting the images to colorimetry in a predetermined color space to obtain colorimetry data;

generating color correction data for compensating a color drift in the colorimetry data of the image printed with the comparison printing devices with respect to the colorimetry data of the reference printing devices;

storing the generated color correction data in a storage area in correspondence with predetermined error information;

acquiring alternative colorimetry data obtained by subjecting a standard image to colorimetry in the predetermined color space, the standard image being printed on a printing medium with a standard ink recording quantity with the printing device filled with alternative ink different from the corresponding ink;

converting the acquired alternative colorimetry data into predictive colorimetry data obtained when a standard image is printed on a printing medium with the standard ink recording quantity with the printing device filled with the corresponding ink and subjected to colorimetry in a predetermined color space;

acquiring error information that represents the result of correlation between the predictive colorimetry data acquired by the conversion and predetermined reference colorimetry data;

taking the stored color correction data as color correction data for compensating a color drift of the corresponding inks if the acquired error information agrees with the predetermined error information;

taking corrected color correction data obtained by correcting the stored color correction data according to the value of the acquired error information as color correction data for compensating a color drift of the corresponding inks if the acquired error information does not agree with the predetermined error information; and correcting, by using the color correction data, printing data that represents an image into printing data for compensating a color drift of an image printed with the printing device, and controlling the printing device to print an image corresponding to the corrected printing data.

4. A computer-readable medium with a printing control program recorded thereon for causing a computer to execute a function of carrying out printing control on a printing device so designed that a print head is filled with a corresponding ink corresponding thereto and the corresponding ink is stuck to a printing medium by the print head to form an image corresponding to printing data, the program carrying out:

a function for filling a predetermined reference printing device and one or more comparison printing devices that develops variation in the quantity of ink stuck to a printing medium as compared with the reference printing device with the corresponding inks;

a function for printing images on printing media with a predetermined ink recording quantity with the reference printing device and the comparison printing devices;

a function for subjecting the images to colorimetry in a predetermined color space to obtain colorimetry data;

a function for generating color correction data for compensating a color drift in the colorimetry data of the image printed with the comparison printing devices with respect to the colorimetry data of the reference printing devices;

a function for storing the generated color correction data in a storage area in correspondence with predetermined error information;

an alternative colorimetry data acquiring function for acquiring alternative colorimetry data obtained by subjecting a printed standard image to colorimetry in the predetermined color space, the standard image being printed on a printing medium with a standard ink recording quantity with the printing device filled with alternative ink different from the corresponding ink;

an error information acquiring function for converting the acquired alternative colorimetry data into predictive colorimetry data obtained when a standard image is printed on a printing medium with the standard ink recording quantity with the printing device filled with the corresponding ink and the printed standard image is subjected to colorimetry in a predetermined color space, and acquiring error information that represents the result of correlation between the predictive colorimetry data acquired by the conversion and predetermined reference colorimetry data;

a color correction data determining function for determining color correction data for compensating a color drift of the corresponding ink in the printing device according to the value of the error information; and a printing control function for correcting, by using the color correction data, printing data that represents an image into printing data for compensating a color drift of an image printed with the printing device, and controlling the printing device to print an image corresponding to the corrected printing data, wherein, if the error information acquired by the error information acquisition function agrees with the predetermined error information, the color correction data determination function takes the stored color correction data as color correction data for compensating a color drift of the corresponding inks, and, if the acquired error information does not agree with the predetermined error information, the color correction data determination function takes corrected color correction data obtained by correcting the stored color correction data according to the value of the acquired error information as color correction data for compensating a color drift of the corresponding inks.

* * * * *